(12) United States Patent
Yoshimura et al.

(10) Patent No.: US 12,101,213 B2
(45) Date of Patent: Sep. 24, 2024

(54) TERMINAL APPARATUS, BASE STATION APPARATUS, AND COMMUNICATION METHOD

(71) Applicant: SHARP KABUSHIKI KAISHA, Sakai (JP)

(72) Inventors: Tomoki Yoshimura, Sakai (JP); Shoichi Suzuki, Sakai (JP); Toshizo Nogami, Sakai (JP); Daiichiro Nakashima, Sakai (JP); Wataru Ouchi, Sakai (JP); Huifa Lin, Sakai (JP); Takahisa Fukui, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 19 days.

(21) Appl. No.: 18/030,988

(22) PCT Filed: Oct. 11, 2021

(86) PCT No.: PCT/JP2021/037525
§ 371 (c)(1),
(2) Date: Apr. 8, 2023

(87) PCT Pub. No.: WO2022/080295
PCT Pub. Date: Apr. 21, 2022

(65) Prior Publication Data
US 2023/0388166 A1 Nov. 30, 2023

(30) Foreign Application Priority Data
Oct. 12, 2020 (JP) ................................. 2020-171851

(51) Int. Cl.
*H04L 27/26* (2006.01)

(52) U.S. Cl.
CPC ............................. *H04L 27/2605* (2013.01)

(58) Field of Classification Search
CPC . H04L 1/0056; H04L 27/2605; H04L 5/0053; H04W 72/04
See application file for complete search history.

(56) References Cited

U.S. PATENT DOCUMENTS 11,729,774 B2 * 8/2023 Matsumura ........... H04W 72/21
370/330
12,010,705 B2 * 6/2024 Sengupta .......... H04W 72/0446
(Continued)

OTHER PUBLICATIONS

NTT Docomo, "New SID Proposal: Study on New Radio Access Technology", RP-160671, 3GPP TSG RAN Meeting #71, Göteborg, Sweden, Mar. 7-10, 2016.
(Continued)

*Primary Examiner* — Jaison Joseph
(74) *Attorney, Agent, or Firm* — ScienBiziP, P.C.

(57) ABSTRACT

An apparatus includes a coder configured to generate a first coded bit sequence by error correction coding of a bit sequence of uplink control information, a rate matcher configured to generate a second coded bit sequence by applying a prescribed amount $C_s$ of cyclic shift to the first coded bit sequence for an s-th uplink channel instance of S uplink channel instances, and a transmitter configured to transmit the second coded bit sequence by using the s-th uplink channel instance. The prescribed amount $C_s$ is determined based on at least some or all of a prescribed amount $C_{s-1}$ for an (s−1)-th uplink channel instance, the number of OFDM symbols included in the (s−1)-th uplink channel instance, and the number $N^{block}_{bit}$ of coded bits mapped per OFDM symbol.

2 Claims, 13 Drawing Sheets

(56) References Cited

U.S. PATENT DOCUMENTS

| | | | |
|---|---|---|---|
| 2019/0159153 A1* | 5/2019 | Li | H04L 27/26 |
| 2022/0103411 A1* | 3/2022 | Noh | H04L 5/0051 |
| 2022/0407623 A1* | 12/2022 | Li | H04L 1/1812 |
| 2023/0388166 A1* | 11/2023 | Yoshimura | H04L 1/0056 |

OTHER PUBLICATIONS

RAN chairman, RAN1 chairman, RAN2chairman, RAN3 chairman, "Release 17 package for RAN", RP-193216, 3GPP TSG RAN Meeting #86, Sitges, Spain, Dec. 9-12, 2019.

* cited by examiner

Figure A: Number of OFDM symbols per slot, slots per frame, and slots per subframe for normal cyclic prefix.

| $\mu$ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Figure B: Number of OFDM symbols per slot, slots per frame, and slots per subframe for extended cyclic prefix.

| $\mu$ | $N_{symb}^{slot}$ | $N_{slot}^{frame,\mu}$ | $N_{slot}^{subframe,\mu}$ |
|---|---|---|---|
| 2 | 12 | 40 | 4 |

FIG. 2

If $E \leq (9/8) \cdot 2^{\lceil \log_2 E \rceil - 1}$ and $K/E < 9/16$ ... (P1)

$n_1 = \lceil \log_2 E \rceil - 1$; ... (P2)

else ... (P3)

$n_1 = \lceil \log_2 E \rceil$; ... (P4)

end if ... (P5)

$R_{min} = 1/8$; ... (P6)

$n_2 = \lceil \log_2(K/R_{min}) \rceil$; ... (P7)

$n = \max\{\min\{n_1, n_2, n_{max}\}, n_{min}\}$ ... (P8)

FIG. 12

TERMINAL APPARATUS, BASE STATION APPARATUS, AND COMMUNICATION METHOD

TECHNICAL FIELD

The present invention relates to a terminal apparatus, a base station apparatus, and a communication method.

This application claims priority to JP 2020-171851 filed on Oct. 12, 2020, the contents of which are incorporated herein by reference.

BACKGROUND ART

In the 3$^{rd}$ Generation Partnership Project (3GPP), a radio access method and a radio network for cellular mobile communications (hereinafter referred to as "Long Term Evolution (LTE)" or "Evolved Universal Terrestrial Radio Access (EUTRA)") have been studied. In LTE, a base station apparatus is also referred to as an evolved NodeB (eNodeB) and a terminal apparatus is also referred to as User Equipment (UE). LTE is a cellular communication system in which multiple areas covered by base station apparatuses are deployed in a cell structure. A single base station apparatus may manage multiple serving cells.

The 3GPP has been studying a next generation standard (New Radio or NR) (NPL 1) to make a proposal for International Mobile Telecommunication (IMT)-2020, a standard for a next generation mobile communication system developed by the International Telecommunication Union (ITU). NR is required to satisfy requirements for three scenarios including enhanced Mobile BroadBand (eMBB), massive Machine Type Communication (mMTC), and Ultra Reliable and Low Latency Communication (URLLC) in a single technology framework.

In the 3GPP, extension of services supported by NR has been studied (NPL 2).

CITATION LIST

Non Patent Literature

NPL 1: "New SID proposal: Study on New Radio Access Technology", RP-160671, NTT docomo, 3GPP TSG RAN Meeting #71, Goteborg, Sweden, 7-10 Mar. 2016.
NPL 2: "Release 17 package for RAN", RP-193216, RAN chairman, RAN1 chairman, RAN2 chairman, RAN3 chairman, 3GPP TSG RAN Meeting #86, Sitges, Spain, 9-12 Dec. 2019

SUMMARY OF INVENTION

Technical Problem

One aspect of the present invention provides a terminal apparatus that efficiently performs communication, a communication method used for the terminal apparatus, a base station apparatus that efficiently performs communication, and a communication method used for the base station apparatus.

Solution to Problem (1) According to some aspects of the present invention, the following measures are provided. Specifically, a first aspect of the present invention provides a terminal apparatus including a coder configured to generate a first coded bit sequence by error correction coding of a bit sequence of uplink information, a rate matcher configured to generate a second coded bit sequence by applying a prescribed amount $C_s$ of cyclic shift to the first coded bit sequence for an s-th uplink channel instance of S uplink channel instances, and a transmitter configured to transmit the second coded bit sequence by using the s-th uplink channel instance, wherein the prescribed amount $C_s$ is determined based on at least some or all of a prescribed amount $C_{s-1}$ for an (s−1)-th uplink channel instance, the number of OFDM symbols included in the (s−1)-th uplink channel instance, and the number $N^{block}_{bit}$ of coded bits mapped per OFDM symbol.

(2) A second aspect of the present invention provides a terminal apparatus including a coder configured to generate a first coded bit sequence by error correction coding of a bit sequence of uplink information, a rate matcher configured to generate a second coded bit sequence by applying a prescribed amount $C_s$ of cyclic shift to the first coded bit sequence for an s-th uplink channel instance of S uplink channel instances, and a transmitter configured to transmit the second coded bit sequence by using the s-th uplink channel instance, wherein the prescribed amount $C_s$ is determined based on at least either indexes of OFDM symbols in a radio frame or indexes of OFDM symbols included in the S uplink channel instances.

(3) A third aspect of the present invention provides a terminal apparatus including a coder configured to generate a first coded bit sequence by error correction coding of a bit sequence of uplink information, a rate matcher configured to generate a second coded bit sequence by applying a prescribed amount $C_s$ of cyclic shift to the first coded bit sequence for an s-th uplink channel instance of S uplink channel instances, and a transmitter configured to transmit the second coded bit sequence by using the s-th uplink channel instance, wherein the prescribed amount $C_s$ is indicated by a higher layer parameter.

(4) A fourth aspect of the present invention provides a base station apparatus including an antenna unit and a baseband unit, wherein a first coded bit sequence is generated by error correction coding of a bit sequence of uplink information, a second coded bit sequence is generated by applying a prescribed amount $C_s$ of cyclic shift to the first coded bit sequence for an s-th uplink channel instance of S uplink channel instances, the second coded bit sequence is transmitted by using the s-th uplink channel instance, the prescribed amount $C_s$ is determined based on at least some or all of a prescribed amount $C_{s-1}$ for an (s−1)-th uplink channel instance, the number of OFDM symbols included in the (s−1)-th uplink channel instance, and the number $N^{block}_{bit}$ of coded bits mapped per OFDM symbol, and the s-th uplink channel instance is received.

(5) A fifth aspect of the present invention provides a base station apparatus including an antenna unit and a baseband unit, wherein a first coded bit sequence is generated by error correction coding of a bit sequence of uplink information, a second coded bit sequence is generated by applying a prescribed amount $C_s$ of cyclic shift to the first coded bit sequence for an s-th uplink channel instance of S uplink channel instances, the second coded bit sequence is transmitted by using the s-th uplink channel instance, the prescribed amount $C_s$ is determined based on at least either indexes of OFDM symbols in a radio frame or indexes of OFDM symbols included in the S uplink channel instances, and the s-th uplink channel instance is received.

(6) A sixth aspect of the present invention provides a base station apparatus including an antenna unit and a baseband unit, wherein a first coded bit sequence is generated by error correction coding of a bit sequence of uplink information, a second coded bit sequence is generated by applying a prescribed amount $C_s$ of cyclic shift to the first coded bit sequence for an s-th uplink channel instance of S uplink channel instances, the second coded bit sequence is transmitted by using the s-th uplink channel instance, the prescribed amount $C_s$ is indicated by a higher layer parameter, and the s-th uplink channel instance is received.

(7) A seventh aspect of the present invention provides a communication method used in a terminal apparatus, the communication method including the steps of generating a first coded bit sequence by error correction coding of a bit sequence of uplink information, generating a second coded bit sequence by applying a prescribed amount $C_s$ of cyclic shift to the first coded bit sequence for an s-th uplink channel instance of S uplink channel instances, and transmitting the second coded bit sequence by using the s-th uplink channel instance, wherein the prescribed amount $C_s$ is determined based on at least some or all of a prescribed amount $C_{s-1}$ for an (s−1)-th uplink channel instance, the number of OFDM symbols included in the (s−1)-th uplink channel instance, and the number $N^{block}_{bit}$ of coded bits mapped per OFDM symbol.

(8) An eighth aspect of the present invention provides a communication method used in a terminal apparatus, including: generating a first coded bit sequence by error correction coding of a bit sequence of uplink information; generating a second coded bit sequence by applying a prescribed amount $C_s$ of cyclic shift to the first coded bit sequence for an s-th uplink channel instance of S uplink channel instances; and transmitting the second coded bit sequence by using the s-th uplink channel instance, wherein the prescribed amount $C_s$ is determined based on at least either indexes of OFDM symbols in a radio frame or indexes of OFDM symbols included in the S uplink channel instances.

(9) A ninth aspect of the present invention provides a communication method used in a terminal apparatus, the communication method including the steps of generating a first coded bit sequence by error correction coding of a bit sequence of uplink information, generating a second coded bit sequence by applying a prescribed amount $C_s$ of cyclic shift to the first coded bit sequence for an s-th uplink channel instance of S uplink channel instances, and transmitting the second coded bit sequence by using the s-th uplink channel instance, wherein the prescribed amount $C_s$ is indicated by a higher layer parameter.

(10) A tenth aspect of the present invention provides a communication method used in a base station apparatus, the communication method including the steps of generating a first coded bit sequence by error correction coding of a bit sequence of uplink information, generating a second coded bit sequence by applying a prescribed amount $C_s$ of cyclic shift to the first coded bit sequence for an s-th uplink channel instance of S uplink channel instances, and transmitting the second coded bit sequence by using the s-th uplink channel instance, wherein the prescribed amount $C_s$ is determined based on at least some or all of a prescribed amount $C_{s-1}$ for an (s−1)-th uplink channel instance, the number of OFDM symbols included in the (s−1)-th uplink channel instance, and the number $N^{block}_{bit}$ of coded bits mapped per OFDM symbol, and the s-th uplink channel instance is received.

(11) An eleventh aspect of the present invention provides a communication method used in a base station apparatus, the communication method including the steps of generating a first coded bit sequence by error correction coding of a bit sequence of uplink information, generating a second coded bit sequence by applying a prescribed amount $C_s$ of cyclic shift to the first coded bit sequence for an s-th uplink channel instance of S uplink channel instances, and transmitting the second coded bit sequence by using the s-th uplink channel instance, wherein the prescribed amount $C_s$ is determined based on at least either indexes of OFDM symbols in a radio frame or indexes of OFDM symbols included in the S uplink channel instances, and the s-th uplink channel instance is received.

(12) A twelfth aspect of the present invention provides a communication method used in a base station apparatus, the communication method including the steps of generating a first coded bit sequence by error correction coding of a bit sequence of uplink information, generating a second coded bit sequence by applying a prescribed amount $C_s$ of cyclic shift to the first coded bit sequence for an s-th uplink channel instance of S uplink channel instances, and transmitting the second coded bit sequence by using the s-th uplink channel instance, wherein the prescribed amount $C_s$ is indicated by a higher layer parameter, and the s-th uplink channel instance is received.

Advantageous Effects of Invention

According to an aspect of the present invention, the terminal apparatus can efficiently perform communication. The base station apparatus can efficiently perform communication.

BRIEF DESCRIPTION OF DRAWINGS

FIG. 2 is an example illustrating a relationship between a subcarrier spacing configuration μ, the number $N^{slot}_{symb}$ of OFDM symbols per slot, and a cyclic Prefix (CP) configuration according to an aspect of the present embodiment.

FIG. 12 is a diagram illustrating an example of a determination procedure for a variable n used for coding of a polar code according to an aspect of the present embodiment.

DESCRIPTION OF EMBODIMENTS

An embodiment of the present invention will be described below.

floor(C) may be a floor function for a real number C. For example, floor(C) may be a function that outputs a maximum integer in a range of not exceeding the real number C. ceil(D) may be a roof function for a real number D. For example, ceil(D) may be a function that outputs a minimum integer in a range of not falling below the real number D. mod(E, F) may be a function that outputs a remainder obtained by dividing E by F. mod(E, F) may be a function that outputs a value corresponding to the remainder obtained by dividing E by F. exp(G)=e^G. Here, e is a Napier's constant. H^I represents H to the power of I. max (J, K) is a function that outputs the maximum value of J and K. Here, max (J, K) is a function that outputs J or K in a case that J and K are equal. min (L, M) is a function that outputs the maximum value of L and M. Here, min (L, M) is a function that outputs L or M in a case that L and M are equal. round (N) is a function that outputs an integer value closest to N.

In the radio communication system according to an aspect of the present embodiment, Orthogonal Frequency Division Multiplex (OFDM) is at least used. An OFDM symbol is a unit of OFDM in the time domain. The OFDM symbol at least includes one or multiple subcarriers. The OFDM symbol is converted into a time-continuous signal in baseband signal generation. In the downlink, Cyclic Prefix-Orthogonal Frequency Division Multiplex (CP-OFDM) is at least used. In the uplink, one of CP-OFDM or Discrete Fourier Transform-spread-Orthogonal Frequency Division Multiplex (DFT-s-OFDM) is used. With Transform precoding being applied to CP-OFDM, DFT-s-OFDM may be given.

The OFDM symbol may be a term including a CP added to the OFDM symbol. In other words, a certain OFDM symbol may include the certain OFDM symbol, and a CP added to the certain OFDM symbol.

Figure 1:
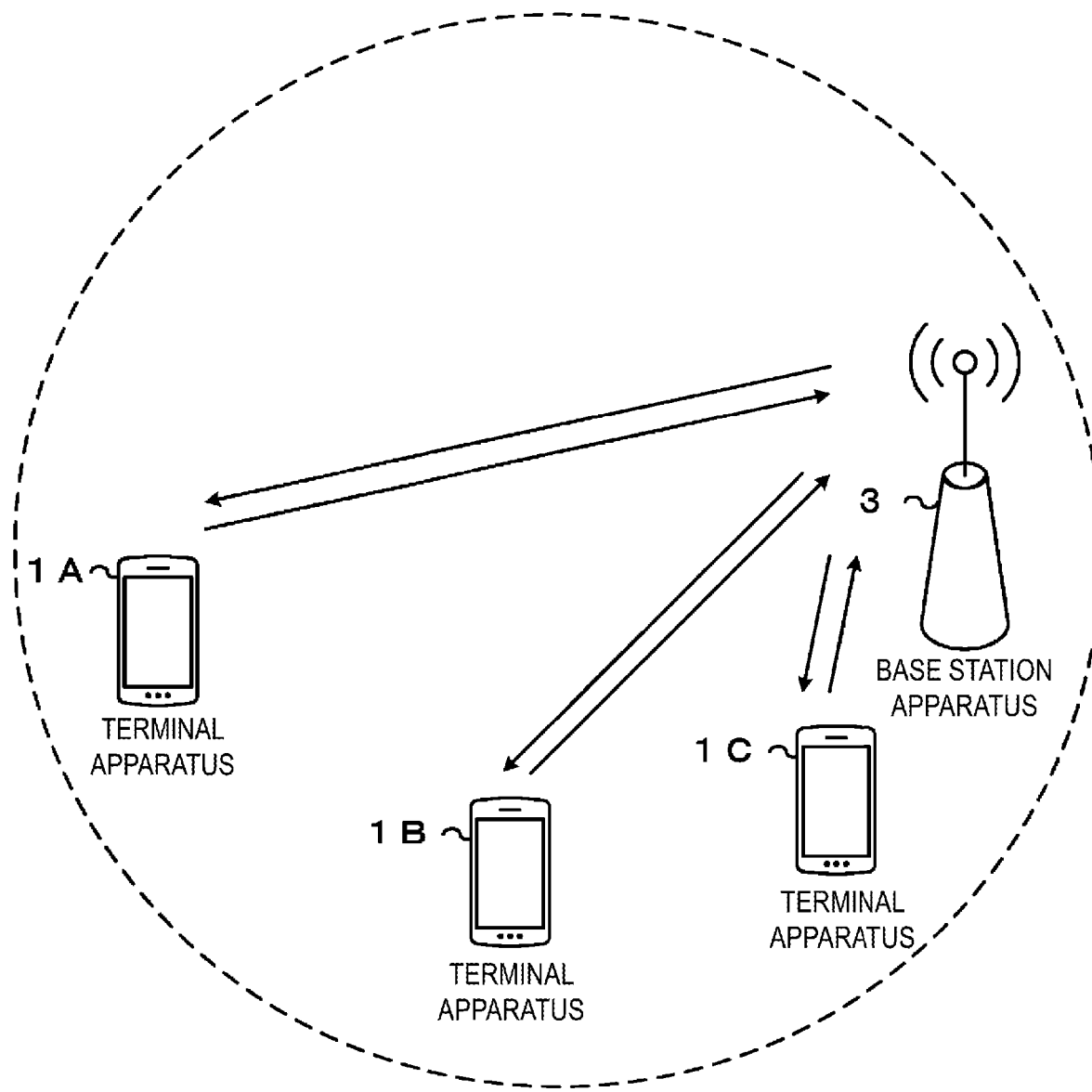
FIG. 1 is a conceptual diagram of a radio communication system according to an aspect of the present embodiment.

FIG. 1 is a conceptual diagram of a radio communication system according to an aspect of the present embodiment. In FIG. 1, the radio communication system at least includes terminal apparatuses 1A to 1C and a base station apparatus 3 (base station #3 (BS #3)). The terminal apparatuses 1A to 1C are hereinafter also referred to as "terminal apparatus 1" (User Equipment #1 (UE #1)).

The base station apparatus 3 may include one or multiple transmission apparatuses (or transmission points, transmission and/or reception apparatuses, transmission and/or reception points). In a case that the base station apparatus 3 includes multiple transmission apparatuses, each of the multiple transmission apparatuses may be deployed at different positions.

The base station apparatus 3 may provide one or multiple serving cells. The serving cell may be defined as a set of resources used for radio communication. The serving cell is also referred to as a cell.

The serving cell may at least include one downlink component carrier (downlink carrier), and/or one uplink component carrier (uplink carrier). The serving cell may at least include two or more downlink component carriers, and/or two or more uplink component carriers. The downlink component carrier and the uplink component carrier are also referred to as "component carrier (carrier)".

For example, for one component carrier, one resource grid may be given. For one component carrier and a certain subcarrier spacing configuration $\mu$, one resource grid may be given. Here, the subcarrier spacing configuration $\mu$ is also referred to as numerology. The resource grid includes $N^{size, \mu}_{grid, x} N^{RB}_{sc}$ subcarriers. The resource grid starts with a common resource block $N^{start, \mu}_{grid, x}$. The common resource block $N^{start, \mu}_{grid, x}$ is also referred to as a reference point of the resource grid. The resource grid includes $N^{subframe, \mu}_{symb}$ OFDM symbols. x is a subscript indicating a transmission direction, and indicates one of a downlink or an uplink. For a set of a certain antenna port p, a certain subcarrier spacing configuration $\mu$, and a certain transmission direction x, one resource grid is given.

$N^{size, \mu}_{grid, x}$ and $N^{start, \mu}_{grid, x}$ are given based on at least a higher layer parameter (CarrierBandwidth). The higher layer parameter is also referred to as an SCS specific carrier. One resource grid corresponds to one SCS specific carrier. One component carrier may include one or multiple SCS specific carriers. The SCS specific carrier may be included in system information. For each of the SCS specific carriers, one subcarrier spacing configuration $\mu$ may be given.

The SubCarrier Spacing (SCS) $\Delta f$ may be $\Delta f = 2^\mu \cdot 15$ kHz. For example, the subcarrier spacing configuration $\mu$ may indicate one of 0, 1, 2, 3, or 4.

FIG. 2 is an example illustrating a relationship between a subcarrier spacing configuration $\mu$, the number $N^{slot}_{symb}$ of OFDM symbols per slot, and a cyclic Prefix (CP) configuration according to an aspect of the present embodiment. In FIG. 2A, for example, in a case that the subcarrier spacing configuration $\mu$ is two and the CP configuration is a normal cyclic prefix (normal CP), $N^{slot}_{symb}=14$, $N^{frame, \mu}_{slot}=40$, and $N^{subframe, \mu}_{slot}=4$. In FIG. 2B, for example, in a case that the subcarrier spacing configuration $\mu$ is two and the CP configuration is an extended cyclic prefix (extended CP), $N^{slot}_{symb}$ 12, $N^{frame, \mu}_{slot}=40$, and $N^{subframe, \mu}_{slot}=4$.

In the radio communication system according to an aspect of the present embodiment, a time unit $T_c$ may be used for expression of the length of the time domain. The time unit $T_c$ is $T_c=1/(\Delta f_{max} \cdot N_f)$. $\Delta f_{max}=480$ kHz. $N_f=4096$. A constant $\kappa$ is $\kappa=\Delta f_{max} \cdot N_f/(\Delta f_{ref} N_{f, ref})=64$. $\Delta f_{ref}$ is 15 kHz. $N_{f, ref}$ is 2048.

Transmission of a signal in the downlink and/or transmission of a signal in the uplink may be organized into a radio frame (system frame, frame) having the length $T_f$. $T_f=(\Delta f_{max} N_f/100) \cdot T_s=10$ ms. "*" represents multiplication. The radio frame includes 10 subframes. The length $T_{sf}$ of the subframe is $(\Delta f_{max} N_f/1000) \cdot T_s=1$ ms. The number of OFDM symbols per subframe is $N^{subframe, \mu}_{symb}= N^{slot}_{symb} N^{subframe, \mu}_{slot}$.

For a certain subcarrier spacing configuration $\mu$, the number and indexes of slots included in a subframe may be provided. For example, slot indexes ng s may be given in ascending order with integer values in the range from 0 to $N^{subframe, \mu}_{slot}-1$ in the subframe. For the subcarrier spacing configuration $\mu$, the number and indexes of slots included in the radio frame may be given. Slot indexes $n^\mu_{s, f}$ may be given in ascending order with integer values in the range from 0 to $N^{frame, \mu}_{slot}-1$ in the radio frame. One slot may include $N^{slot}_{symb}$ continuous OFDM symbols. $N^{slot}_{symb}=14$.

Figure 3:
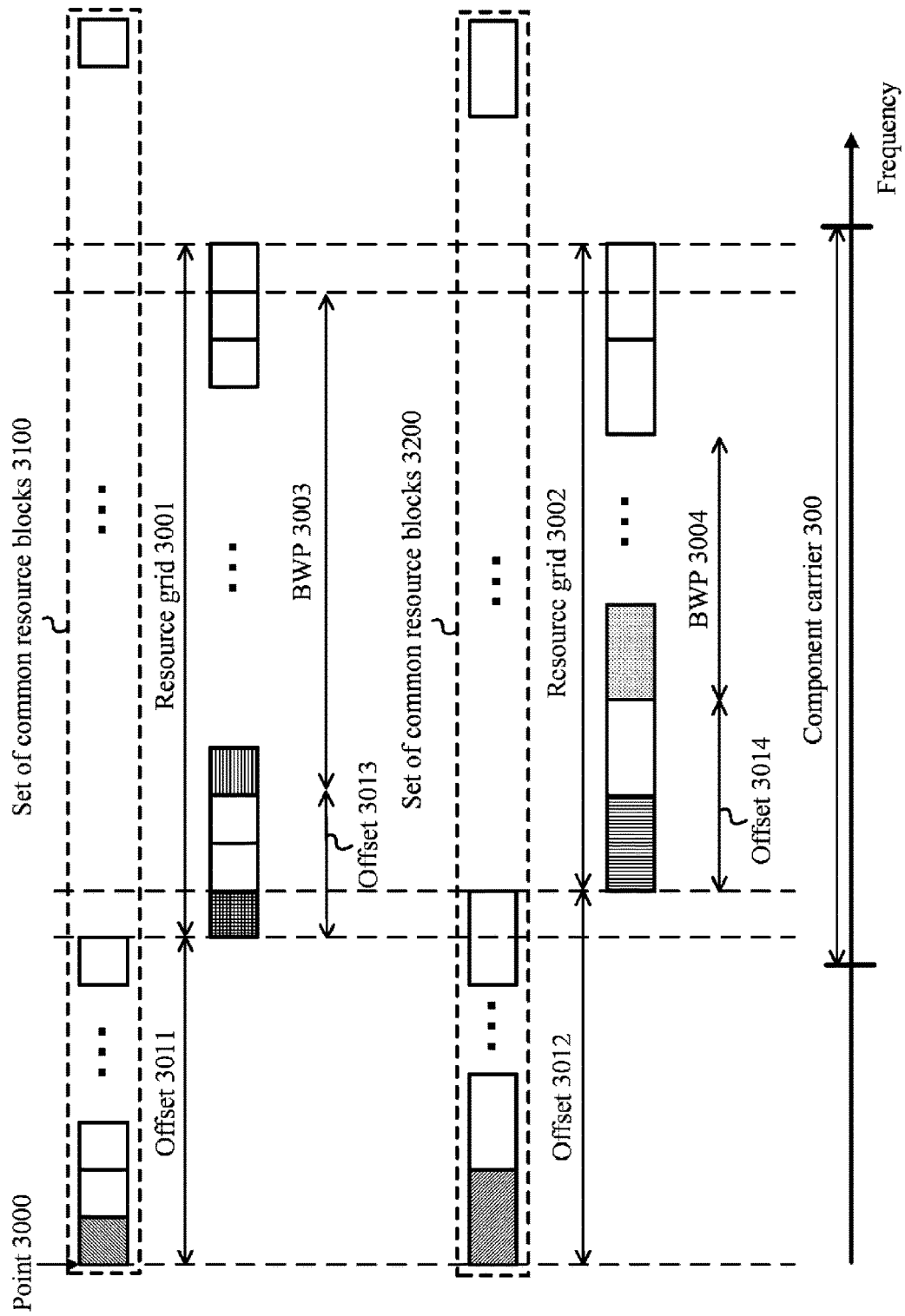
FIG. 3 is a diagram illustrating an example of a configuration method of resource grids according to an aspect of the present embodiment.

FIG. 3 is a diagram illustrating an example of a configuration method of the resource grid according to an aspect of the present embodiment. The horizontal axis of FIG. 3 represents a frequency domain. FIG. 3 illustrates a configuration example of a resource grid of a subcarrier spacing $\mu_1$ in a component carrier 300, and a configuration example of a resource grid of subcarrier spacing $\mu_2$ in the certain component carrier. As described above, for a certain component carrier, one or multiple subcarrier spacings may be configured. FIG. 3 assumes that $\mu_1=\mu_2-1$. However, various aspects of the present embodiment are not limited to the condition of $\mu_1=\mu_2-1$.

The component carrier 300 is a band having a prescribed width in the frequency domain.

A Point 3000 is an identifier for identifying a certain subcarrier. The point 3000 is also referred to as a point A. A set 3100 of Common resource blocks (CRBs) is a set of common resource blocks for the subcarrier spacing configuration $\mu_1$.

Of the common resource block set 3100, a common resource block (block hatched with lines rising diagonally up and to the right in FIG. 3) including the point 3000 is also referred to as a reference point of the common resource block set 3100. The reference point of the common resource block set 3100 may be a common resource block having an index of 0 in the common resource block set 3100.

An offset 3011 is an offset from the reference point of the common resource block set 3100 to a reference point of a resource grid 3001. The offset 3011 is represented by the number of common resource blocks for the subcarrier spacing configuration $\mu_1$. The resource grid 3001 includes $N^{size, \mu}_{grid1, x}$ common resource blocks starting from the reference point of the resource grid 3001.

An offset 3013 is an offset from the reference point of the resource grid 3001 to a reference point ($N^{start, \mu}_{BWP, i1}$) of a Bandwidth Part (BWP) 3003 having an index of i1.

A common resource block set 3200 is a set of common resource blocks for the subcarrier spacing configuration $\mu_2$.

Of the common resource block set 3200, a common resource block (block hatched with lines rising diagonally up and to the left in FIG. 3) including the point 3000 is also referred to as a reference point of the common resource block set 3200. The reference point of the common resource block set 3200 may be a common resource block having an index of 0 in the common resource block set 3200.

An offset 3012 is an offset from the reference point of the common resource block set 3200 to a reference point of a resource grid 3002. The offset 3012 is represented by the number of common resource blocks for the subcarrier spacing $\mu_2$. The resource grid 3002 includes $N^{size, \mu}_{grid2, x}$ common resource blocks starting from the reference point of the resource grid 3002.

An offset 3014 is an offset from the reference point of the resource grid 3002 to a reference point ($N^{start, \mu}_{BWP, i2}$) of a BWP 3004 having an index of i2.

Figure 4:
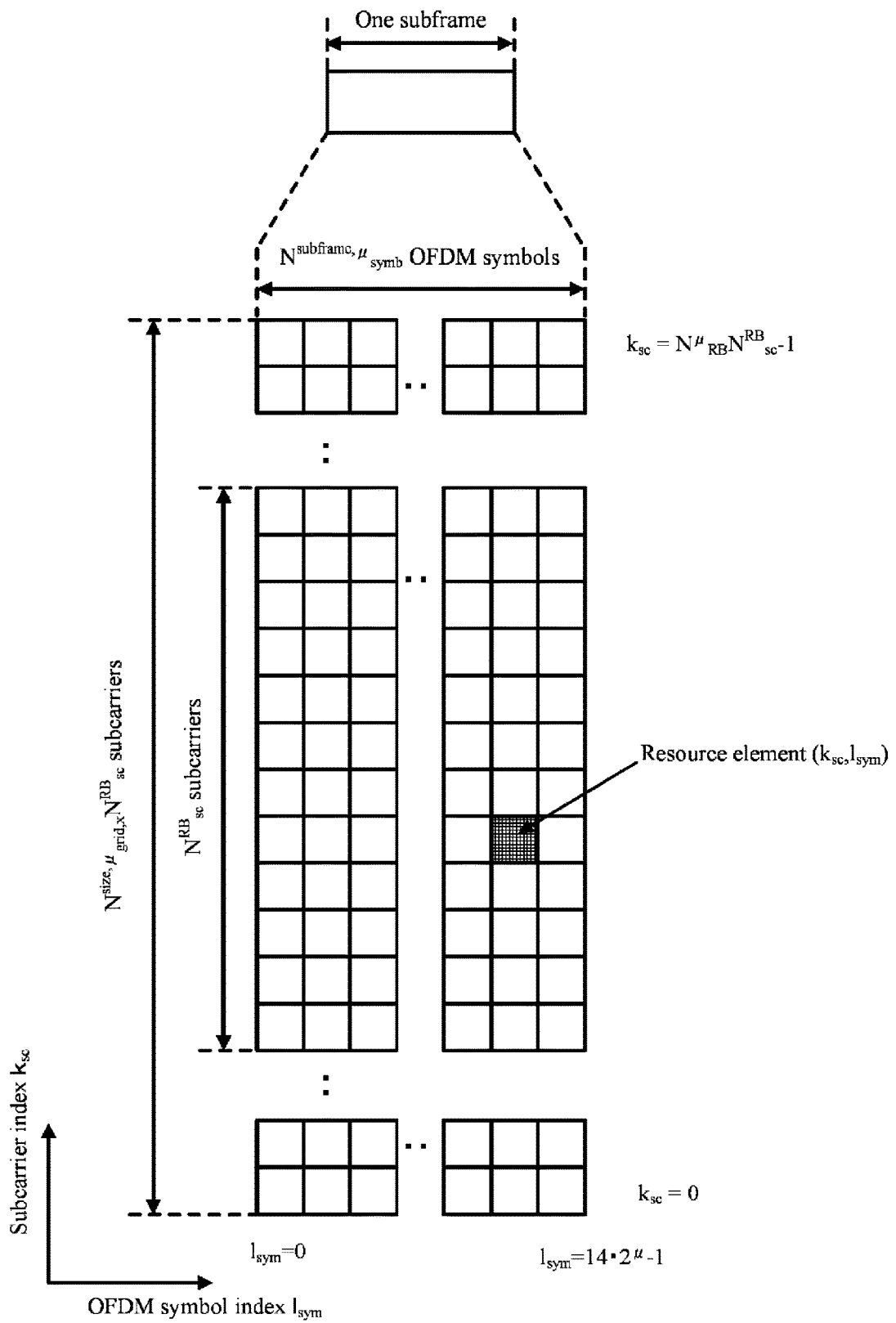
FIG. 4 is a diagram illustrating a configuration example of a resource grid 3001 according to an aspect of the present embodiment.

FIG. 4 is a diagram illustrating a configuration example of the resource grid 3001 according to an aspect of the present embodiment. In the resource grid of FIG. 4, the horizontal axis corresponds to an OFDM symbol index $l_{sym}$, and the vertical axis corresponds to a subcarrier index $k_{sc}$. The resource grid 3001 includes $N^{size, \mu}_{grid1, x} N^{RB}_{sc}$ subcarriers, and $N^{subframe, \mu}_{symb}$ OFDM symbols. In the resource grid, a resource identified with the subcarrier index $k_{sc}$ and the OFDM symbol index $l_{sym}$ is also referred to as a Resource Element (RE).

The Resource Block (RB) includes $N^{RB}_{sc}$ continuous subcarriers. The resource block is a general term for a common resource block, a Physical Resource Block (PRB), and a Virtual Resource Block (VRB). Here, $N^{RB}_{sc}=12$.

A resource block unit is a set of resources corresponding to one OFDM symbol in one resource block. In other words, one resource block unit includes 12 resource elements corresponding to one OFDM symbol in one resource block.

The common resource blocks for a certain subcarrier spacing configuration $\mu$ are assigned with indexes (indexing) in ascending order from 0 in the frequency domain in a certain common resource block set. The common resource block having an index of 0 for a certain subcarrier spacing configuration $\mu$ includes (or collides with, matches) the point 3000. An index $n^{\mu}_{CRB}$ of the common resource block for a certain subcarrier spacing configuration $\mu$ satisfies a relationship of $n^{\mu}_{CRB}=\text{ceil}(k_{sc}/N^{RB}_{sc})$. Here, a subcarrier with $k_{sc}=0$ is a subcarrier having the same center frequency as the center frequency of a subcarrier corresponding to the point 3000.

The physical resource blocks for a certain subcarrier spacing configuration $\mu$ are assigned with indexes in ascending order from 0 in the frequency domain in a certain BWP. An index $n^{\mu}_{PRB}$ of the physical resource block for a certain subcarrier spacing configuration $\mu$ satisfies a relationship of $n^{\mu}_{CRB}=n^{\mu}_{PRB}+N^{start, \mu}_{BWP, i}$. Here, $N^{start, \mu}_{BWP, i}$ indicates a reference point of the BWP having an index of i.

The BWP is defined as a subset of common resource blocks included in the resource grid. The BWP includes $N^{size, \mu}_{BWP, i}$ common resource blocks starting from the reference point $N^{start, \mu}_{BWP, i}$ of the BWP. A BWP configured for a downlink carrier is also referred to as a downlink BWP. The BWP configured for the uplink component carrier is also referred to as an uplink BWP.

An antenna port may be defined by that a channel on which a symbol in a certain antenna port is conveyed can be inferred from a channel on which another symbol in the certain antenna port is conveyed (An antenna port is defined such that the channel over which a symbol on the antenna port is conveyed can be inferred from the channel over which another symbol on the same antenna port is conveyed). For example, the channel may correspond to a physical channel. The symbol may correspond to an OFDM symbol. The symbol may correspond to a resource block unit. The symbol may correspond to a resource element.

The fact that large scale property of a channel on which a symbol is conveyed in one antenna port can be inferred from a channel on which a symbol is conveyed in another antenna port is described that the two antenna ports are quasi co-located (QCL). The large scale property may at least include long term performance of a channel. The large scale property may at least include a part or all of delay spread, Doppler spread, Doppler shift, an average gain, an average delay, and a beam parameter (spatial Rx parameters). The fact that the first antenna port and the second antenna port are QCL with respect to a beam parameter may mean that a receive beam assumed by a receiver for the first antenna port and a receive beam assumed by the receiver for the second antenna port are the same. The fact that the first antenna port and the second antenna port are QCL with respect to a beam parameter may mean that a transmit beam assumed by a receiver for the first antenna port and a transmit beam assumed by the receiver for the second antenna port are the same. In a case that the large scale property of a channel through which a symbol is transmitted in one antenna port can be estimated from a channel through which a symbol is transmitted in another antenna port, the terminal apparatus 1 may assume that the two antenna ports are QCL. The fact that two antenna ports are QCL may mean that it is assumed that the two antenna ports are QCL.

Carrier aggregation may mean that communication is performed by using multiple serving cells being aggregated. Carrier aggregation may mean that communication is performed by using multiple component carriers being aggregated. Carrier aggregation may mean that communication is performed by using multiple downlink component carriers being aggregated. Carrier aggregation may mean that communication is performed by using multiple uplink component carriers being aggregated.

Figure 5:
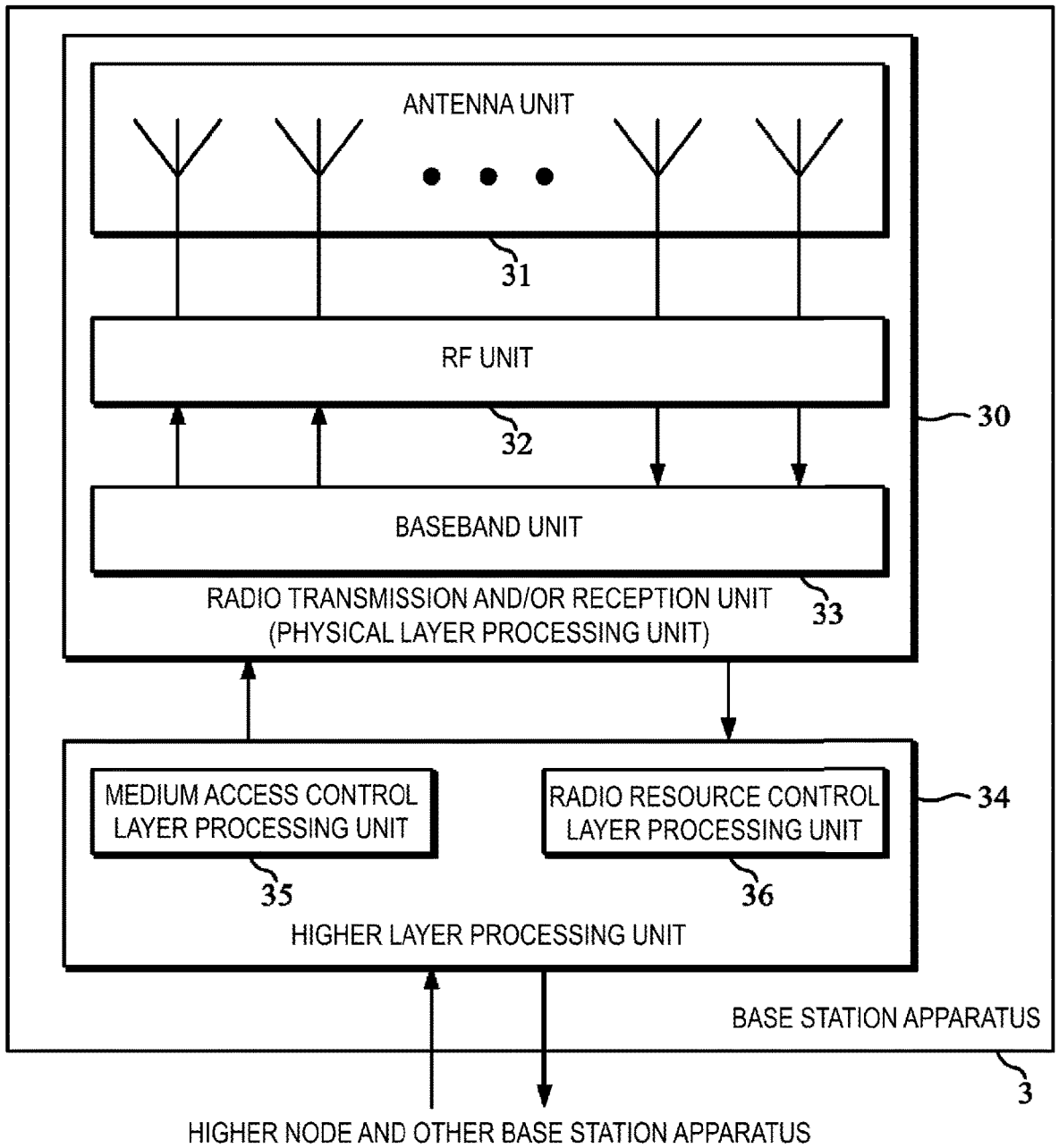
FIG. 5 is a schematic block diagram illustrating a configuration example of a base station apparatus 3 according to an aspect of the present embodiment.

FIG. 5 is a schematic block diagram illustrating a configuration example of the base station apparatus 3 according to an aspect of the present embodiment. As illustrated in FIG. 5, the base station apparatus 3 at least includes a part or all of a radio transmission and/or reception unit (physical layer processing unit) 30 and/or a higher layer processing unit 34. The radio transmission and/or reception unit 30 at least includes a part or all of an antenna unit 31, a Radio Frequency (RF) unit 32, and a baseband unit 33. The higher layer processing unit 34 at least includes a part or all of a medium access control layer processing unit 35 and a Radio Resource Control (RRC) layer processing unit 36.

The radio transmission and/or reception unit 30 at least includes a part or all of a radio transmitting unit 30a and a radio receiving unit 30b. Here, apparatus configurations of the baseband unit included in the radio transmitting unit 30a and the baseband unit included in the radio receiving unit 30b may be the same or different from each other. Apparatus configurations of the RF unit included in the radio transmitting unit 30a and the RF unit included in the radio receiving unit 30b may be the same or different from each other. Apparatus configurations of the antenna unit included in the radio transmitting unit 30a and the antenna unit included in the radio receiving unit 30b may be the same or different from each other.

For example, the radio transmitting unit 30a may generate and transmit a baseband signal of a PDSCH. For example, the radio transmitting unit 30a may generate and transmit a baseband signal of a PDCCH. For example, the radio transmitting unit 30a may generate and transmit a baseband signal of a PBCH. For example, the radio transmitting unit 30a may generate and transmit a baseband signal of a synchronization signal. For example, the radio transmitting unit 30a may generate and transmit a baseband signal of a PDSCH DMRS. For example, the radio transmitting unit 30a may generate and transmit a baseband signal of a PDCCH DMRS. For example, the radio transmitting unit 30a may generate and transmit a baseband signal of a CSI-RS. For example, the radio transmitting unit 30a may generate and transmit a baseband signal of a DL PTRS.

For example, the radio receiving unit 30b may receive a PRACH. For example, the radio receiving unit 30b may receive and demodulate a PUCCH. The radio receiving unit 30b may receive and demodulate a PUSCH. For example, the radio receiving unit 30b may receive a PUCCH DMRS. For example, the radio receiving unit 30b may receive a PUSCH DMRS. For example, the radio receiving unit 30b may receive a UL PTRS. For example, the radio receiving unit 30b may receive an SRS.

The higher layer processing unit 34 outputs downlink data (transport block) to the radio transmission and/or reception unit 30 (or the radio transmitting unit 30a). The higher layer processing unit 34 performs processing of a Medium Access Control (MAC) layer, a Packet Data Convergence Protocol (PDCP) layer, a Radio Link Control (RLC) layer, and an RRC layer.

The medium access control layer processing unit 35 included in the higher layer processing unit 34 performs processing of the MAC layer.

The radio resource control layer processing unit 36 included in the higher layer processing unit 34 performs processing of the RRC layer. The radio resource control layer processing unit 36 manages various pieces of configuration information/parameters (RRC parameters) of the terminal apparatus 1. The radio resource control layer processing unit 36 sets the RRC parameter, based on an RRC message received from the terminal apparatus 1.

The radio transmission and/or reception unit 30 (or the radio transmitting unit 30a) performs processing such as modulation and coding. The radio transmission and/or reception unit 30 (or the radio transmitting unit 30a) performs modulation, coding, baseband signal generation (conversion into a time-continuous signal) on downlink data to generate a physical signal, and transmits the physical signal to the terminal apparatus 1. The radio transmission and/or reception unit 30 (or the radio transmitting unit 30a) may map the physical signal to a certain component carrier, and transmit the mapped physical signal to the terminal apparatus 1.

The radio transmission and/or reception unit 30 (or the radio receiving unit 30b) performs processing such as demodulation and decoding. The radio transmission and/or reception unit 30 (or the radio receiving unit 30b) separates, demodulates, and decodes a received physical signal, and outputs decoded information to the higher layer processing unit 34. The radio transmission and/or reception unit 30 (or the radio receiving unit 30b) may perform a channel access procedure prior to transmission of the physical signal.

The RF unit 32 converts (down converts) a signal received via the antenna unit 31 into a baseband signal by means of orthogonal demodulation, and removes unnecessary frequency components. The RF unit 32 outputs a processed analog signal to the baseband unit.

The baseband unit 33 converts an analog signal input from the RF unit 32 into a digital signal. The baseband unit 33 removes a portion corresponding to a Cyclic Prefix (CP) from the converted digital signal, performs a Fast Fourier Transform (FFT) on the signal from which the CP has been removed, and extracts a signal in the frequency domain.

The baseband unit 33 performs inverse fast Fourier transform (IFFT) on data to generate an OFDM symbol, adds a CP to the generated OFDM symbol, generates a baseband digital signal, and converts the baseband digital signal into an analog signal. The baseband unit 33 outputs the converted analog signal to the RF unit 32.

The RF unit 32 removes an unnecessary frequency component from the analog signal input from the baseband unit 33 by using a low-pass filter, up converts the analog signal into a carrier frequency, and transmits the converted analog signal via the antenna unit 31. The RF unit 32 may have a function of controlling transmission power. The RF unit 32 is also referred to as a transmission power control unit.

For the terminal apparatus 1, one or multiple serving cells (or component carriers, downlink component carriers, uplink component carriers) may be configured.

Each of the serving cells configured for the terminal apparatus 1 may be one of a Primary cell (PCell), a Primary SCG cell (PSCell), or a Secondary Cell (SCell).

The PCell is a serving cell included in a Master Cell Group (MCG). The PCell is a cell in which an initial connection establishment procedure or a connection re-establishment procedure is performed (has been performed) by the terminal apparatus 1.

The PSCell is a serving cell included in a Secondary Cell Group (SCG). The PSCell is a serving cell in which random access is performed by the terminal apparatus 1 in a reconfiguration procedure with synchronization (Reconfiguration with synchronization).

The SCell may be included in one of the MCG or the SCG.

A serving cell group (cell group) is a term at least including an MCG and an SCG. The serving cell group may include one or multiple serving cells (or component carriers). One or multiple serving cells (or component carriers) included in the serving cell group may be operated by means of carrier aggregation.

One or multiple downlink BWPs may be configured for each of the serving cells (or downlink component carriers). One or multiple uplink BWPs may be configured for each of the serving cells (or uplink component carriers).

Among one or multiple downlink BWPs configured for the serving cell (or the downlink component carrier), one downlink BWP may be configured as an active downlink BWP (or one downlink BWP may be activated). Among one or multiple uplink BWPs configured for the serving cell (or the uplink component carrier), one uplink BWP may be configured as an active uplink BWP (or one uplink BWP may be activated).

The PDSCH, the PDCCH, and the CSI-RS may be received in the active downlink BWP. The terminal apparatus 1 may receive the PDSCH, the PDCCH, and the CSI-RS in the active downlink BWP. The PUCCH and the PUSCH may be transmitted in the active uplink BWP. The terminal apparatus 1 may transmit the PUCCH and the PUSCH in the active uplink BWP. The active downlink BWP and the active uplink BWP are also referred to as an active BWP.

The PDSCH, the PDCCH, and the CSI-RS need not be received in downlink BWPs (inactive downlink BWPs) other than the active downlink BWP. The terminal apparatus 1 need not receive the PDSCH, the PDCCH, and the CSI-RS in the downlink BWP other than the active downlink BWP. The PUCCH and the PUSCH need not be transmitted in uplink BWPs (inactive uplink BWPs) other than the active uplink BWP. The terminal apparatus 1 need not transmit the PUCCH and the PUSCH in an uplink BWP other than the active uplink BWP. The inactive downlink BWP and the inactive uplink BWP are also referred to as an inactive BWP.

Downlink BWP switch is used for deactivating one active downlink BWP, and activating any one of the inactive downlink BWPs other than the one active downlink BWP. The downlink BWP switch may be controlled by a BWP field included in downlink control information. The downlink BWP switch may be controlled based on a higher layer parameter.

Uplink BWP switch is used for deactivating one active uplink BWP, and activating any one of the inactive uplink BWPs other than the one active uplink BWP. The uplink BWP switch may be controlled by a BWP field included in downlink control information. The uplink BWP switch may be controlled based on a higher layer parameter.

Among one or multiple downlink BWPs configured for the serving cell, two or more downlink BWPs need not be configured for the active downlink BWP. For the serving cell, at certain time, one downlink BWP may be active.

Among one or multiple uplink BWPs configured for the serving cell, two or more uplink BWPs need not be configured for the active uplink BWP. For the serving cell, at certain time, one uplink BWP may be active.

Figure 6:
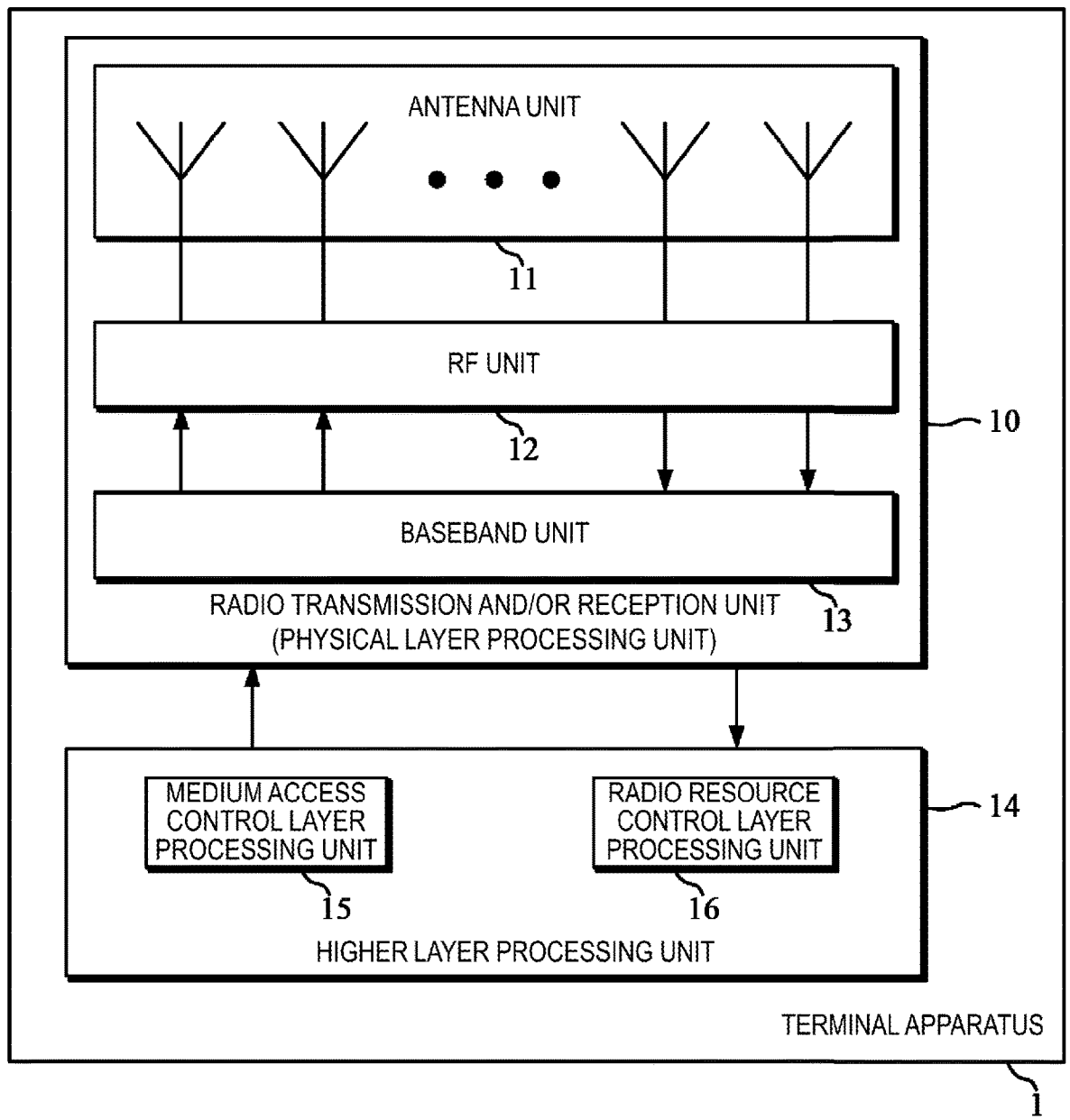
FIG. 6 is a schematic block diagram illustrating a configuration example of a terminal apparatus 1 according to an aspect of the present embodiment.

FIG. 6 is a schematic block diagram illustrating a configuration example of the terminal apparatus 1 according to an aspect of the present embodiment. As illustrated in FIG. 6, the terminal apparatus 1 at least includes one or all of a radio transmission and/or reception unit (physical layer processing unit) 10 and a higher layer processing unit 14. The radio transmission and/or reception unit 10 at least includes a part or all of an antenna unit 11, an RF unit 12, and a baseband unit 13. The higher layer processing unit 14 at least includes a part or all of a medium access control layer processing unit 15 and a radio resource control layer processing unit 16.

The radio transmission and/or reception unit 10 at least includes a part or all of a radio transmitting unit 10a and a radio receiving unit 10b. Here, apparatus configurations of the baseband unit 13 included in the radio transmitting unit 10a and the baseband unit 13 included in the radio receiving unit 10b may be the same or different from each other. Apparatus configurations of the RF unit 12 included in the radio transmitting unit 10a and the RF unit 12 included in the radio receiving unit 10b may be the same or different from each other. Apparatus configurations of the antenna unit 11 included in the radio transmitting unit 10a and the antenna unit 11 included in the radio receiving unit 10b may be the same or different from each other.

For example, the radio transmitting unit 10a may generate and transmit a baseband signal of a PRACH. For example, the radio transmitting unit 10a may generate and transmit a baseband signal of a PUCCH. The radio transmitting unit 10a may generate and transmit a baseband signal of a PUSCH. For example, the radio transmitting unit 10a may generate and transmit a baseband signal of a PUCCH DMRS. For example, the radio transmitting unit 10a may generate and transmit a baseband signal of a PUSCH DMRS. For example, the radio transmitting unit 10a may generate and transmit a baseband signal of a UL PTRS. For example, the radio transmitting unit 10a may generate and transmit a baseband signal of an SRS.

For example, the radio receiving unit 10b may receive and demodulate a PDSCH. For example, the radio receiving unit 10b may receive and demodulate a PDCCH. For example, the radio receiving unit 10b may receive and demodulate a PBCH. For example, the radio receiving unit 10b may receive a synchronization signal. For example, the radio receiving unit 10b may receive a PDSCH DMRS. For example, the radio receiving unit 10b may receive a PDCCH DMRS. For example, the radio receiving unit 10b may receive a CSI-RS. For example, the radio receiving unit 10b may receive a DL PTRS.

The higher layer processing unit 14 outputs uplink data (transport block) to the radio transmission and/or reception unit 10 (or the radio transmitting unit 10a). The higher layer processing unit 14 performs processing of the MAC layer, the packet data convergence protocol layer, the radio link control layer, and the RRC layer.

The medium access control layer processing unit 15 included in the higher layer processing unit 14 performs processing of the MAC layer.

The radio resource control layer processing unit 16 included in the higher layer processing unit 14 performs processing of the RRC layer. The radio resource control layer processing unit 16 manages various pieces of configuration information/parameters (RRC parameters) of the terminal apparatus 1. The radio resource control layer processing unit 16 sets the RRC parameters, based on an RRC message received from the base station apparatus 3.

The radio transmission and/or reception unit 10 (or the radio transmitting unit 10a) performs processing such as modulation and coding. The radio transmission and/or reception unit 10 (or the radio transmitting unit 10a) performs modulation, coding, baseband signal generation (conversion into a time-continuous signal) on uplink data to generate a physical signal, and transmits the physical signal to the base station apparatus 3. The radio transmission and/or reception unit 10 (or the radio transmitting unit 10a)

may map the physical signal to a certain BWP (active uplink BWP), and transmit the mapped physical signal to the base station apparatus 3.

The radio transmission and/or reception unit 10 (or the radio receiving unit 10b) performs processing such as demodulation and decoding. The radio transmission and/or reception unit 10 (or the radio receiving unit 30b) may receive a physical signal in a certain BWP (active downlink BWP) of a certain serving cell. The radio transmission and/or reception unit 10 (or the radio receiving unit 10b) separates, demodulates, and decodes the received physical signal, and outputs decoded information to the higher layer processing unit 14. The radio transmission and/or reception unit 10 (radio receiving unit 10b) may perform a channel access procedure prior to transmission of the physical signal.

The RF unit 12 converts (down converts) a signal received via the antenna unit 11 into a baseband signal by means of orthogonal demodulation, and removes an unnecessary frequency component. The RF unit 12 outputs a processed analog signal to the baseband unit 13.

The baseband unit 13 converts the analog signal input from the RF unit 12 into a digital signal. The baseband unit 13 removes a portion corresponding to a Cyclic Prefix (CP) from the converted digital signal, performs a Fast Fourier Transform (FFT) on the signal from which the CP has been removed and extracts a signal in the frequency domain.

The baseband unit 13 performs inverse fast Fourier transform (IFFT) on uplink data to generate an OFDM symbol, adds a CP to the generated OFDM symbol, generates a baseband digital signal, and converts the baseband digital signal into an analog signal. The baseband unit 13 outputs the converted analog signal to the RF unit 12.

The RF unit 12 removes unnecessary frequency components from the analog signal input from the baseband unit 13 through a low-pass filter, up converts the analog signal into a signal of a carrier frequency, and transmits the up converted signal via the antenna unit 11. The RF unit 12 may have a function of controlling transmission power. The RF unit 12 is also referred to as a transmission power control unit.

The physical signal (signal) will be described below.

The physical signal is a general term for a downlink physical channel, a downlink physical signal, an uplink physical channel, and an uplink physical channel. The physical channel is a general term for a downlink physical channel and an uplink physical channel. The physical signal is a general term for a downlink physical signal and an uplink physical signal.

The uplink physical channel may correspond to a set of resource elements for carrying information that is generated in a higher layer. The uplink physical channel may be a physical channel used in the uplink component carrier. The uplink physical channel may be transmitted by the terminal apparatus 1. The uplink physical channel may be received by the base station apparatus 3. In the radio communication system according to an aspect of the present embodiment, at least a part or all of the following uplink physical channels may be used.

Physical Uplink Control CHannel (PUCCH)
Physical Uplink Shared CHannel (PUSCH)
Physical Random Access CHannel (PRACH)

The PUCCH may be used to transmit Uplink Control Information (UCI). The PUCCH may be transmitted for conveying (delivering, transmitting) the uplink control information. The uplink control information may be mapped to the PUCCH. The terminal apparatus 1 may transmit the PUCCH to which the uplink control information is mapped.

The base station apparatus 3 may receive the PUCCH to which the uplink control information is mapped.

The uplink control information (uplink control information bit, uplink control information sequence, uplink control information type) at least includes a part or all of Channel State Information (CSI), a Scheduling Request (SR), and Hybrid Automatic Repeat request Acknowledgement (HARQ-ACK) information.

The channel state information is also referred to as a channel state information bit or a channel state information sequence. The scheduling request is also referred to as a scheduling request bit or a scheduling request sequence. The HARQ-ACK information is also referred to as a HARQ-ACK information bit or a HARQ-ACK information sequence.

The HARQ-ACK information may at least include a HARQ-ACK corresponding to a Transport block (or TB, Medium Access Control Protocol Data Unit (MAC PDU), Downlink-Shared Channel (DL-SCH), Uplink-Shared Channel (UL-SCH), Physical Downlink Shared Channel (PDSCH), Physical Uplink Shared Channel (PUSCH)). The HARQ-ACK may indicate an acknowledgement (ACK) or a negative-acknowledgement (NACK) corresponding to the transport block. The ACK may indicate that decoding of the transport block has been completed successfully (has been decoded). The NACK may indicate that decoding of the transport block has not completed successfully (has not been decoded). The HARQ-ACK information may include a HARQ-ACK codebook including one or multiple HARQ-ACK bits.

The fact that the HARQ-ACK information and the transport block correspond to each other may mean that the HARQ-ACK information and the PDSCH used for conveying the transport block correspond to each other.

The HARQ-ACK may indicate an ACK or a NACK corresponding to one Code Block Group (CBG) included in the transport block.

The scheduling request may be at least used for requesting a resource of the PUSCH (or the UL-SCH) for initial transmission (new transmission). The scheduling request bit may be used for indicating one of a positive SR or a negative SR. The scheduling request bit indicating the positive SR is also referred to as "the positive SR being transmitted". The positive SR may indicate that a resource of the PUSCH (or the UL-SCH) for initial transmission is requested by the terminal apparatus 1. The positive SR may indicate that a scheduling request is triggered by a higher layer. The positive SR may be transmitted in a case that the higher layer indicates transmission of the scheduling request. The scheduling request bit indicating the negative SR is also referred to as "the negative SR being transmitted". The negative SR may indicate that a resource of the PUSCH (or the UL-SCH) for initial transmission is not requested by the terminal apparatus 1. The negative SR may indicate that the scheduling request is not triggered by the higher layer. The negative SR may be transmitted in a case that transmission of a scheduling request is not indicated by the higher layer.

Channel state information may include at least some or all of a Channel Quality Indicator (CQI), a Precoder Matrix Indicator (PMI), and a Rank Indicator (RI). The CQI is an indicator related to quality (for example, propagation strength) of a channel or quality of a physical channel, and the PMI is an indicator related to a precoder. The RI is an indicator related to a transmission rank (or the number of transmission layers).

The channel state information may be given based at least on reception of a physical signal (for example, a CSI-RS) at least used for channel measurement. The channel state information may be selected by the terminal apparatus 1, based at least on reception of the physical signal at least used for channel measurement. Channel measurement may include interference measurement.

The PUCCH may correspond to a PUCCH format. The PUCCH may be a set of resource elements used for conveying the PUCCH format. The PUCCH may include the PUCCH format.

The PUSCH may be used for transmitting a transport block and/or uplink control information. The PUSCH may be used for transmitting the transport block and/or the uplink control information corresponding to the UL-SCH. The PUSCH may be used for conveying the transport block and/or the uplink control information. The PUSCH may be used for conveying the transport block and/or the uplink control information corresponding to the UL-SCH. The transport block may be mapped to the PUSCH. The transport block corresponding to the UL-SCH may be mapped to the PUSCH. The uplink control information may be mapped to the PUSCH. The terminal apparatus 1 may transmit the PUSCH to which the transport block and/or the uplink control information is mapped. The base station apparatus 3 may receive the PUSCH to which the transport block and/or the uplink control information is mapped.

The PRACH may be used for transmitting a random access preamble. The PRACH may be used for conveying a random access preamble. A PRACH sequence $x_{u,v}(n)$ is defined by $x_{u,v}(n)=x_u(\mathrm{mod}(n+C_v, L_{RA}))$. $x_u$ may be a Zadoff-Chu (ZC) sequence. $x_u$ is defined by $x_u=\exp(-j\pi u i(i+1)/L_{RA})$. j is an imaginary unit. $\pi$ is ratio of the circumference of a circle to its diameter. $C_v$ corresponds to a cyclic shift of the PRACH sequence. $L_{RA}$ corresponds to the length of the PRACH sequence. $L_{RA}$ is 839, or 139. i is an integer in the range from 0 to $L_{RA}-1$. u is a sequence index for the PRACH sequence. The terminal apparatus 1 may transmit the PRACH. The base station apparatus 3 may receive the PRACH.

For a certain PRACH occasion, 64 random access preambles are defined. The random access preamble is identified (determined, given) based on at least the cyclic shift $C_v$ of the PRACH sequence and the sequence index u for the PRACH sequence. An index may be assigned to each of the 64 identified random access preambles.

The uplink physical signal may correspond to a set of resource elements. The uplink physical signal need not carry information generated in a higher layer. The uplink physical signal may be a physical signal used in the uplink component carrier. The terminal apparatus 1 may transmit the uplink physical signal. The base station apparatus 3 may receive the uplink physical signal. In the radio communication system according to an aspect of the present embodiment, at least a part or all of the following uplink physical signals may be used.

UpLink Demodulation Reference Signal (UL DMRS)
Sounding Reference Signal (SRS)
UpLink Phase Tracking Reference Signal (UL PTRS)

The UL DMRS is a general term for a DMRS for the PUSCH and a DMRS for the PUCCH.

A set of antenna ports of the DMRS for the PUSCH (DMRS related to the PUSCH, DMRS included in the PUSCH, DMRS corresponding to the PUSCH) may be given based on a set of antenna ports for the PUSCH. In other words, the set of antenna ports of the DMRS for the PUSCH may be the same as a set of antenna ports of the PUSCH.

Transmission of the PUSCH and transmission of the DMRS for the PUSCH may be indicated by one DCI format (or may be scheduled). The PUSCH and the DMRS for the PUSCH may be collectively referred to as a PUSCH. Transmission of the PUSCH may mean transmission of the PUSCH and the DMRS for the PUSCH.

The PUSCH may be inferred from the DMRS for the PUSCH. In other words, a channel (propagation path) of the PUSCH may be inferred from the DMRS for the PUSCH.

A set of antenna ports of the DMRS for the PUCCH (DMRS related to the PUCCH, DMRS included in the PUCCH, DMRS corresponding to the PUCCH) may be the same as a set of antenna ports of the PUCCH.

Transmission of the PUCCH and transmission of the DMRS for the PUCCH may be indicated by one DCI format (or may be triggered). Mapping of the PUCCH to resource elements (resource element mapping) and/or mapping of the DMRS for the PUCCH to resource elements may be given by one PUCCH format. The PUCCH and the DMRS for the PUCCH may be collectively referred to as a PUCCH. Transmission of the PUCCH may mean transmission of the PUCCH and the DMRS for the PUCCH.

The PUCCH may be inferred from the DMRS for the PUCCH. In other words, a channel of the PUCCH may be inferred from the DMRS for the PUCCH.

The downlink physical channel may correspond to a set of resource elements for carrying information generated in a higher layer. The downlink physical channel may be a physical channel used in a downlink component carrier. The base station apparatus 3 may transmit the downlink physical channel. The terminal apparatus 1 may receive the downlink physical channel. In the radio communication system according to an aspect of the present embodiment, at least a part or all of the following downlink physical channels may be used.

Physical Broadcast Channel (PBCH)
Physical Downlink Control Channel (PDCCH)
Physical Downlink Shared Channel (PDSCH)

The PBCH may be used for transmitting a Master Information Block (MIB) and/or physical layer control information. The PBCH may be transmitted for conveying (delivering, transmitting) the MIB and/or the physical layer control information. The BCH may be mapped to the PBCH. The terminal apparatus 1 may receive the PBCH to which the MIB and/or the physical layer control information is mapped. The base station apparatus 3 may transmit the PBCH to which the MIB and/or the physical layer control information is mapped. The physical layer control information is also referred to as a PBCH payload, or a PBCH payload related to timing. The MIB may include one or multiple higher layer parameters.

The physical layer control information includes 8 bits. The physical layer control information may at least include a part or all of the following 0A to 0D.

0A) Radio frame bit
0B) Half radio frame (half system frame, half frame) bit
0C) SS/PBCH block index bit
0D) Subcarrier offset bit The radio frame bit is used for indicating a radio frame in which the PBCH is transmitted (radio frame including a slot in which the PBCH is transmitted). The radio frame bit includes 4 bits. The radio frame bit may include 4 bits of a 10-bit radio frame indicator. For example, the radio frame indicator may be at least used for identifying radio frames from index 0 to index 1023.

The half radio frame bit is used for indicating, out of the radio frame in which the PBCH is transmitted, which of the first five subframes or the last five subframes is used for transmission of the PBCH. Here, the half radio frame may include five subframes. The half radio frame may include the first five subframes out of the 10 subframes included in the radio frame. The half radio frame may include the last five subframes out of the 10 subframes included in the radio frame.

The SS/PBCH block index bit is used for indicating an SS/PBCH block index. The SS/PBCH block index bit includes 3 bits. The SS/PBCH block index bit may include 3 bits of a 6-bit SS/PBCH block index indicator. The SS/PBCH block index indicator may be at least used for identifying SS/PBCH blocks from index 0 to index 63.

The subcarrier offset bit is used for indicating a subcarrier offset. The subcarrier offset may be used for indicating a difference between the first subcarrier to which the PBCH is mapped and the first subcarrier to which the control resource set having an index of 0 is mapped.

The PDCCH may be used for transmitting Downlink Control Information (DCI). The PDCCH may be transmitted for conveying (delivering, transmitting) the downlink control information. The downlink control information may be mapped to the PDCCH. The terminal apparatus 1 may receive the PDCCH to which the downlink control information is mapped. The base station apparatus 3 may transmit the PDCCH to which the downlink control information is mapped.

The downlink control information may correspond to a DCI format. The downlink control information may be included in the DCI format. The downlink control information may be mapped to each field of the DCI format.

DCI format 0_0, DCI format 0_1, DCI format 1_0, and DCI format 1_1 are DCI formats including a set of fields different from each other. An uplink DCI format is a general term for DCI format 0_0 and DCI format 0_1. A downlink DCI format is a general term for DCI format 1_0 and DCI format 1_1.

DCI format 0_0 is at least used for scheduling the PUSCH of a certain cell (or mapped to a certain cell). DCI format 0_0 at least includes a part or all of fields from 1A to 1E.
 1A) DCI format identification field (Identifier field for DCI formats)
 1B) Frequency domain resource allocation field (Frequency domain resource assignment field)
 1C) Time domain resource allocation field (Time domain resource assignment field)
 1D) Frequency hopping flag field
 1E) Modulation and Coding Scheme (MCS) field The DCI format identification field may indicate whether the DCI format including the DCI format identification field is an uplink DCI format or a downlink DCI format. The DCI format identification field included in DCI format 0_0 may indicate 0 (or may indicate that DCI format 0_0 is an uplink DCI format).

The frequency domain resource assignment field included in DCI format 0_0 may be at least used for indicating allocation of frequency resources for the PUSCH.

The time domain resource assignment field included in DCI format 0_0 may be at least used for indicating allocation time resources for the PUSCH.

The frequency hopping flag field may be at least used for indicating whether or not frequency hopping is applied to the PUSCH.

The MCS field included in DCI format 0_0 may be at least used for indicating a part or all of a modulation scheme for the PUSCH and/or a target coding rate. The target coding rate may be a target coding rate for the transport block of the PUSCH. The size of the transport block (Transport Block Size (TBS)) of the PUSCH may be given based at least on a part or all of the target coding rate and the modulation scheme for the PUSCH.

DCI format 0_0 need not include a field used for a CSI request. In other words, CSI need not be requested using DCI format 0_0.

DCI format 0_0 need not include a carrier indicator field. In other words, the uplink component carrier to which the PUSCH scheduled using DCI format 0_0 is mapped may be the same as the uplink component carrier to which the PDCCH including DCI format 0_0 is mapped.

DCI format 0_0 need not include the BWP field. In other words, the uplink BWP to which the PUSCH scheduled using DCI format 0_0 is mapped may be the same as the uplink BWP to which the PDCCH including DCI format 0_0 is mapped.

DCI format 0_1 is at least used for scheduling of the PUSCH of a certain cell (mapped to a certain cell). DCI format 0_1 at least includes a part or all of fields of 2A to 2H.
 2A) DCI format identification field
 2B) Frequency domain resource assignment field
 2C) Uplink time domain resource assignment field
 2D) Frequency hopping flag field
 2E) MCS field
 2F) CSI request field
 2G) BWP field
 2H) Carrier indicator field The DCI format identification field included in DCI format 0_1 may indicate 0 (or may indicate that DCI format 0_1 is an uplink DCI format).

The frequency domain resource assignment field included in DCI format 0_1 may be at least used for indicating allocation of frequency resources for the PUSCH.

The time domain resource assignment field included in DCI format 0_1 may be at least used for indicating allocation time resources for the PUSCH.

The MCS field included in DCI format 0_1 may be at least used for indicating a part or all of a modulation scheme for the PUSCH and/or a target coding rate.

In a case that the BWP field is included in DCI format 0_1, the BWP field may be used for indicating an uplink BWP to which the PUSCH is mapped. In a case that the BWP field is not included in DCI format 0_1, the uplink BWP to which the PUSCH is mapped may be the same as the uplink BWP to which the PDCCH including DCI format 0_1 used for scheduling of the PUSCH is mapped. In a case that the number of uplink BWPs configured for the terminal apparatus 1 in a certain uplink component carrier is two or more, the number of bits of the BWP field included in DCI format 0_1 used for scheduling of the PUSCH mapped to the certain uplink component carrier may be 1 bit or more. In a case that the number of uplink BWPs configured for the terminal apparatus 1 in a certain uplink component carrier is one, the number of bits of the BWP field included in DCI format 0_1 used for scheduling of the PUSCH mapped to the certain uplink component carrier may be 0 bits (or the BWP field need not be included in DCI format 0_1 used for scheduling of the PUSCH mapped to the certain uplink component carrier).

The CSI request field is at least used for indicating the report of the CSI.

In a case that the carrier indicator field is included in DCI format 0_1, the carrier indicator field may be used for indicating the uplink component carrier to which the PUSCH is mapped. In a case that the carrier indicator field is not included in DCI format 0_1, the uplink component carrier to which the PUSCH is mapped may be the same as the uplink component carrier to which the PDCCH including DCI format 0_1 used for scheduling of the PUSCH is mapped. In a case that the number of uplink component carriers configured for the terminal apparatus 1 in a certain serving cell group is two or more (case that uplink carrier aggregation is operated in a certain serving cell group), the number of bits of the carrier indicator field included in DCI format 0_1 used for scheduling of the PUSCH mapped to the certain serving cell group may be 1 bit or more (for example, 3 bits). In a case that the number of uplink component carriers configured for the terminal apparatus 1 in a certain serving cell group is one (case that uplink carrier aggregation is not operated in a certain serving cell group), the number of bits of the carrier indicator field included in DCI format 0_1 used for scheduling of the PUSCH mapped to the certain serving cell group may be 0 bits (or the carrier indicator field need not be included in DCI format 0_1 used for scheduling of the PUSCH mapped to the certain serving cell group).

DCI format 1_0 is at least used for scheduling of the PDSCH of a certain cell (mapped to a certain cell). DCI format 1_0 at least includes a part or all of 3A to 3F.
3A) DCI format identification field
3B) Frequency domain resource assignment field
3C) Time domain resource assignment field
3D) MCS field
3E) PDSCH_HARQ feedback timing indication field (PDSCH to HARQ feedback timing indicator field)
3F) PUCCH resource indication field (PUCCH resource indicator field)

The DCI format identification field included in DCI format 1_0 may indicate 1 (or may indicate that DCI format 1_0 is a downlink DCI format).

The frequency domain resource assignment field included in DCI format 1_0 may be at least used for indicating allocation of frequency resources for the PDSCH.

The time domain resource assignment field included in DCI format 1_0 may be at least used for indicating allocation of time resources for the PDSCH.

The MCS field included in DCI format 1_0 may be at least used for indicating a part or all of a modulation scheme for the PDSCH and/or a target coding rate. The target coding rate may be a target coding rate for the transport block of the PDSCH. The size of the transport block (Transport Block Size (TBS)) of the PDSCH may be given based at least on a part or all of the target coding rate and the modulation scheme for the PDSCH.

The PDSCH_HARQ feedback timing indication field may be at least used for indicating an offset from the slot including the last OFDM symbol of the PDSCH to the slot including the first OFDM symbol of the PUCCH.

The PUCCH resource indication field may be a field indicating an index of one of one or multiple PUCCH resources included in a PUCCH resource set. The PUCCH resource set may include one or multiple PUCCH resources.

DCI format 1_0 need not include the carrier indicator field. In other words, the downlink component carrier to which the PDSCH scheduled using DCI format 1_0 is mapped may be the same as the downlink component carrier to which the PDCCH including DCI format 1_0 is mapped.

DCI format 1_0 need not include the BWP field. In other words, the downlink BWP to which the PDSCH scheduled using DCI format 1_0 is mapped may be the same as the downlink BWP to which the PDCCH including DCI format 1_0 is mapped.

DCI format 1_1 is at least used for scheduling the PDSCH of a certain cell (or mapped to a certain cell). DCI format 1_1 at least includes a part or all of 4A to 4I.
4A) DCI format identification field
4B) Frequency domain resource assignment field
4C) Time domain resource assignment field
4E) MCS field
4F) PDSCH_HARQ feedback timing indication field
4G) PUCCH resource indicator field
4H) BWP field
4I) Carrier indicator field The DCI format identification field included in DCI format 1_1 may indicate 1 (or may indicate that DCI format 1_1 is a downlink DCI format).

The frequency domain resource assignment field included in DCI format 1_1 may be at least used for indicating allocation of frequency resources for the PDSCH.

The time domain resource assignment field included in DCI format 1_1 may be at least used for indicating allocation of time resources for the PDSCH.

The MCS field included in DCI format 1_1 may be at least used for indicating a part or all of the modulation scheme for the PDSCH and/or the target coding rate.

In a case that the PDSCH_HARQ feedback timing indication field is included in DCI format 1_1, the PDSCH_HARQ feedback timing indication field may be at least used for indicating an offset from the slot including the last OFDM symbol of the PDSCH to the slot including the first OFDM symbol of the PUCCH. In a case that the PDSCH_HARQ feedback timing indication field is not included in DCI format 1_1, an offset from the slot including the last OFDM symbol of the PDSCH to the slot including the first OFDM symbol of the PUCCH may be identified by a higher layer parameter.

The PUCCH resource indication field may be a field indicating an index of one of one or multiple PUCCH resources included in a PUCCH resource set.

In a case that the BWP field is included in DCI format 1_1, the BWP field may be used for indicating the downlink BWP to which the PDSCH is mapped. In a case that the BWP field is not included in DCI format 1_1, the downlink BWP to which the PDSCH is mapped may be the same as the downlink BWP to which the PDCCH including DCI format 1_1 used for scheduling of the PDSCH is mapped. In a case that the number of downlink BWPs configured for the terminal apparatus 1 in a certain downlink component carrier is two or more, the number of bits of the BWP field included in DCI format 1_1 used for scheduling of the PDSCH mapped to the certain downlink component carrier may be 1 bit or more. In a case that the number of downlink BWPs configured for the terminal apparatus 1 in a certain downlink component carrier is one, the number of bits of the BWP field included in DCI format 1_1 used for scheduling of the PDSCH mapped to the certain downlink component carrier may be 0 bits (or the BWP field need not be included in DCI format 1_1 used for scheduling of the PDSCH mapped to the certain downlink component carrier).

In a case that the carrier indicator field is included in DCI format 1_1, the carrier indicator field may be used for indicating the downlink component carrier to which the PDSCH is mapped. In a case that the carrier indicator field is not included in DCI format 1_1, the downlink component carrier to which the PDSCH is mapped may be the same as the downlink component carrier to which the PDCCH including DCI format 1_1 used for scheduling of the PDSCH is mapped. In a case that the number of downlink component carriers configured for the terminal apparatus 1 in a certain serving cell group is two or more (case that downlink carrier aggregation is operated in a certain serving cell group), the number of bits of the carrier indicator field included in DCI format 1_1 used for scheduling of the PDSCH mapped to the certain serving cell group may be 1 bit or more (for example, 3 bits). In a case that the number of downlink component carriers configured for the terminal apparatus 1 in a certain serving cell group is one (case that downlink carrier aggregation is not operated in a certain serving cell group), the number of bits of the carrier indicator field included in DCI format 1_1 used for scheduling of the PDSCH mapped to the certain serving cell group may be 0 bits (or the carrier indicator field need not be included in DCI format 1_1 used for scheduling of the PDSCH mapped to the certain serving cell group).

The PDSCH may be used for transmitting the transport block. The PDSCH may be used for transmitting the transport block corresponding to the DL-SCH. The PDSCH may be used for conveying the transport block. The PDSCH may be used for conveying the transport block corresponding to the DL-SCH. The transport block may be mapped to the PDSCH. The transport block corresponding to the DL-SCH may be mapped to the PDSCH. The base station apparatus 3 may transmit the PDSCH. The terminal apparatus 1 may receive the PDSCH.

The downlink physical signal may correspond to a set of resource elements. The downlink physical signal need not carry information generated in a higher layer. The downlink physical signal may be a physical signal used in the downlink component carrier. The downlink physical signal may be transmitted by the base station apparatus 3. The downlink physical signal may be transmitted by the terminal apparatus 1. In the radio communication system according to an aspect of the present embodiment, at least a part or all of the following downlink physical signals may be used.

Synchronization Signal (SS)
DownLink DeModulation Reference Signal (DL DMRS)
Channel State Information-Reference Signal (CSI-RS)
DownLink Phase Tracking Reference Signal (DL PTRS)

The synchronization signal may be at least used for the terminal apparatus 1 to establish synchronization of the frequency domain and/or the time domain in the downlink. The synchronization signal is a general term for the Primary Synchronization Signal (PSS) and the Secondary Synchronization Signal (SSS).

Figure 7:
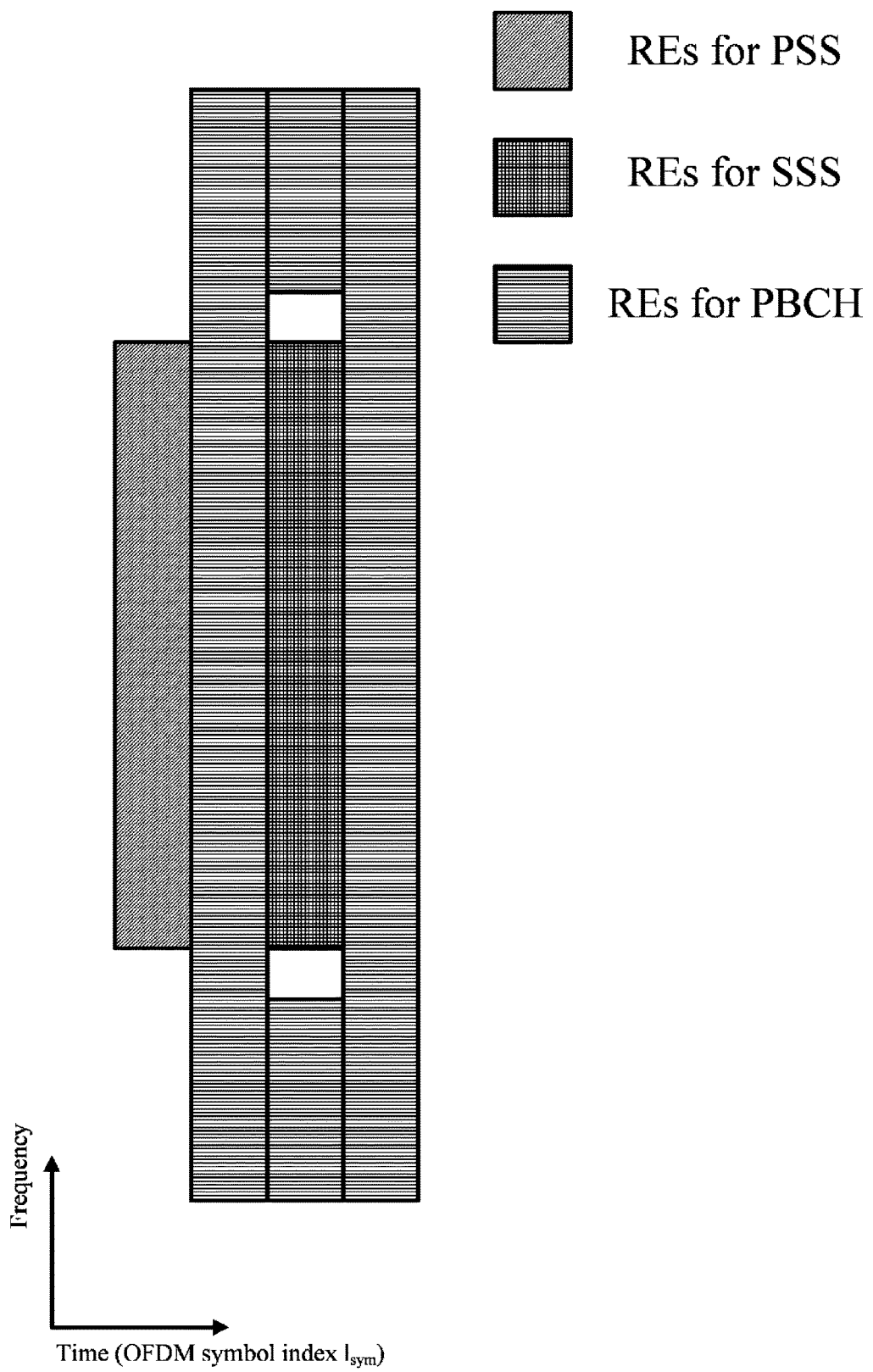
FIG. 7 is a diagram illustrating a configuration example of the SS/PBCH block according to an aspect of the present embodiment.

FIG. 7 is a diagram illustrating a configuration example of the SS/PBCH block according to an aspect of the present embodiment. In FIG. 7, the horizontal axis corresponds to a time axis (OFDM symbol index $l_{sym}$), and the vertical axis represents the frequency domain. The block hatched with diagonal lines represents a set of resource elements for the PSS. The block hatched with grid lines represents a set of resource elements for the SSS. The block hatched with horizontal lines represents a set of resource elements for the PBCH and the DMRS for the PBCH (DMRS related to the PBCH, DMRS included in the PBCH, DMRS corresponding to the PBCH).

As illustrated in FIG. 7, the SS/PBCH block includes the PSS, the SSS, and the PBCH. The SS/PBCH block includes four continuous OFDM symbols. The SS/PBCH block includes 240 subcarriers. The PSS is mapped to the 57th to 183rd subcarriers in the first OFDM symbol. The SSS is mapped to the 57th to 183rd subcarriers in the third OFDM symbol. Zero may be set to the 1st to 56th subcarriers of the first OFDM symbol. Zero may be set to the 184th to 240th subcarriers of the first OFDM symbol. Zero may be set to the 49th to 56th subcarriers of the third OFDM symbol. Zero may be set to the 184th to 192nd subcarriers of the third OFDM symbol. The PBCH is mapped to subcarriers which are the 1st to 240th subcarriers of the second OFDM symbol and to which the DMRS for the PBCH is not mapped. The PBCH is mapped to subcarriers which are the 1st to 48th subcarriers of the third OFDM symbol and to which the DMRS for the PBCH is not mapped. The PBCH is mapped to subcarriers which are the 193rd to 240th subcarriers of the third OFDM symbol and to which the DMRS for the PBCH is not mapped. The PBCH is mapped to subcarriers which are the 1st to 240th subcarriers of the fourth OFDM symbol and to which the DMRS for the PBCH is not mapped.

The PSS, the SSS, the PBCH, and the antenna port of the DMRS for the PBCH may be the same.

The PBCH on which the symbol of the PBCH in a certain antenna port is conveyed may be inferred by the DMRS for the PBCH mapped to the slot to which the PBCH is mapped and for the PBCH included in the SS/PBCH block including the PBCH.

The DL DMRS is a general term for a DMRS for the PBCH, a DMRS for the PDSCH, and a DMRS for the PDCCH.

A set of antenna ports of the DMRS for the PDSCH (DMRS related to the PDSCH, DMRS included in the PDSCH, DMRS corresponding to the PDSCH) may be given based on a set of antenna ports for the PDSCH. In other words, the set of antenna ports of the DMRS for the PDSCH may be the same as the set of antenna ports for the PDSCH.

Transmission of the PDSCH and transmission of the DMRS for the PDSCH may be indicated (or may be scheduled) by one DCI format. The PDSCH and the DMRS for the PDSCH may be collectively referred to as a PDSCH. Transmission of the PDSCH may be transmission of the PDSCH and the DMRS for the PDSCH.

The PDSCH may be inferred from the DMRS for the PDSCH. In other words, a channel of the PDSCH may be inferred from the DMRS for the PDSCH. In a case that a set of resource elements in which the symbol of a certain PDSCH and a set of resource elements in which the symbol of the DMRS for the certain PDSCH is conveyed are included in the same Precoding Resource Group (PRG), the PDSCH on which the symbol of the PDSCH in a certain antenna port is conveyed may be inferred by the DMRS for the PDSCH.

The antenna port of the DMRS for the PDCCH (DMRS related to the PDCCH, DMRS included in the PDCCH, DMRS corresponding to the PDCCH) may be the same as the antenna port for the PDCCH.

The PDCCH may be inferred from the DMRS for the PDCCH. In other words, a channel of the PDCCH may be inferred from the DMRS for the PDCCH. In a case that the same precoder is applied to a set of resource elements in which the symbol of a certain PDCCH is conveyed and a set of resource elements in which the symbol of the DMRS for the certain PDCCH is conveyed (assumed to be applied), the PDCCH on which the symbol of the PDCCH in a certain antenna port is conveyed may be inferred by the DMRS for the PDCCH.

A Broadcast CHannel (BCH), an Uplink-Shared CHannel (UL-SCH), and a Downlink-Shared CHannel (DL-SCH) are transport channels. A channel used in the MAC layer is referred to as a transport channel. A unit of the transport channel used in the MAC layer is also referred to as a transport block (TB) or a MAC Protocol Data Unit (PDU). Control of the Hybrid Automatic Repeat reQuest (HARD) is performed for each transport block in the MAC layer. The transport block is a unit of data that the MAC layer delivers to the physical layer. In the physical layer, the transport block is mapped to a codeword and modulation processing is performed for each codeword.

For each serving cell, one UL-SCH and one DL-SCH may be given. The BCH may be given to the PCell. The BCH need not be given to the PSCell and the SCell.

A Broadcast Control CHannel (BCCH), a Common Control CHannel (CCCH), and a Dedicated Control CHannel (DCCH) are logical channels. For example, the BCCH is a channel of the RRC layer used for transmitting the MIB or system information. A Common Control CHannel (CCCH) may be used for transmitting a common RRC message in multiple terminal apparatuses 1. Here, the CCCH may be, for example, used for the terminal apparatus 1 that is not in a state of RRC connection. A Dedicated Control CHannel (DCCH) may be at least used for transmitting a dedicated RRC message to the terminal apparatus 1. Here, the DCCH may be, for example, used for the terminal apparatus 1 that is in a state of RRC connection.

The RRC message includes one or multiple RRC parameters (information elements). For example, the RRC message may include the MIB. The RRC message may include the system information. The RRC message may include a message corresponding to the CCCH. The RRC message may include a message corresponding to the DCCH. The RRC message including a message corresponding to the DCCH is also referred to as a specific RRC message.

The BCCH in the logical channel may be mapped to the BCH or the DL-SCH in the transport channel. The CCCH in the logical channel may be mapped to the DL-SCH or the UL-SCH in the transport channel. The DCCH in the logical channel may be mapped to the DL-SCH or the UL-SCH in the transport channel.

The UL-SCH in the transport channel may be mapped to the PUSCH in the physical channel. The DL-SCH in the transport channel may be mapped to the PDSCH in the physical channel. The BCH in the transport channel may be mapped to the PBCH in the physical channel.

The higher layer parameter is a parameter included in the RRC message or a Medium Access Control Control Element (MAC CE). In other words, the higher layer parameter is a general term for a MIB, system information, a message corresponding to the CCCH, a message corresponding to the DCCH, and parameters included in the MAC CE. The parameters included in the MAC CE are transmitted by a MAC CE (Control Element) command.

Procedures performed by the terminal apparatus 1 at least include a part or all of the following 5A to 5C.

5A) Cell search
5B) Random access
5C) Data communication

The cell search is a procedure in which synchronization with a certain cell related to the time domain and the frequency domain is performed by the terminal apparatus 1, which is used for detecting a physical cell identity (physical cell ID). In other words, the terminal apparatus 1 may perform synchronization with a certain cell in the time domain and the frequency domain by means of cell search, and detect a physical cell ID.

A sequence of the PSS is given based at least on the physical cell ID. A sequence of the SSS is given based at least on the physical cell ID.

An SS/PBCH block candidate indicates a resource allowed to (capable of, scheduled to, configured to, defined to, having a possibility of) transmit the SS/PBCH block.

A set of SS/PBCH block candidates in a certain half radio frame is also referred to as an SS burst set. The SS burst set is also referred to as a transmission window, an SS transmission window, or a DRS transmission window (Discovery Reference Signal transmission window). The SS burst set is a general term at least including a first SS burst set and a second SS burst set.

The base station apparatus 3 transmits SS/PBCH blocks with one or multiple indexes in a prescribed period. The terminal apparatus 1 may detect at least one SS/PBCH block out of the SS/PBCH blocks with one or multiple indexes, and attempt decoding of the PBCH included in the SS/PBCH block.

The random access is a procedure at least including a part or all of a message 1, a message 2, a message 3, and a message 4.

The message 1 is a procedure in which the PRACH is transmitted by the terminal apparatus 1. The terminal apparatus 1 transmits the PRACH in one PRACH occasion selected out of one or multiple PRACH occasions, based at least on the index of the SS/PBCH block candidate detected based on cell search. Each of the PRACH occasions is defined based on at least time domain and frequency domain resources.

The terminal apparatus 1 transmits one random access preamble selected out of the PRACH occasion corresponding to the index of the SS/PBCH block candidate in which the SS/PBCH block is detected.

The message 2 is a procedure in which detection of DCI format 1_0 with a Cyclic Redundancy Check (CRC) scrambled with a Random Access-Radio Network Temporary Identifier (RA-RNTI) by the terminal apparatus 1 is attempted. The terminal apparatus 1 attempts detection of the PDCCH including the DCI format in a control resource set given based on the MIB included in the PBCH included in the SS/PBCH block detected based on cell search, and resources indicated based on a configuration of a search space set. The message 2 is also referred to as a random access response.

The message 3 is a procedure in which the PUSCH scheduled using a random access response grant included in DCI format 1_0 detected through the procedure of the message 2 is transmitted. Here, the random access response grant is indicated by the MAC CE included in the PDSCH scheduled using DCI format 1_0.

The PUSCH scheduled based on the random access response grant is one of a message 3 PUSCH or a PUSCH. The message 3 PUSCH includes a contention resolution identifier (contention resolution ID) MAC CE. The contention resolution ID MAC CE includes a contention resolution ID.

Retransmission of the message 3 PUSCH is scheduled using DCI format 0_0 with a CRC scrambled based on a Temporary Cell-Radio Network Temporary Identifier (TC-RNTI).

The message 4 is a procedure in which detection of DCI format 1_0 with a CRC scrambled based on one of a Cell-Radio Network Temporary Identifier (C-RNTI) or a TC-RNTI is attempted. The terminal apparatus 1 receives the PDSCH scheduled based on DCI format 1_0. The PDSCH may include a contention resolution ID.

Data communication is a general term for downlink communication and uplink communication.

In data communication, the terminal apparatus 1 attempts detection of the PDCCH (monitors the PDCCH) in a control resource set and resources identified based on a search space set.

The control resource set is a set of resources including a certain number of resource blocks and a certain number of OFDM symbols. In the frequency domain, the control resource set may include continuous resources (non-interleaved mapping), or may include distributed resources (interleaver mapping).

A set of resource blocks constituting the control resource set may be indicated by a higher layer parameter. The number of OFDM symbols constituting the control resource set may be indicated by a higher layer parameter.

The terminal apparatus 1 attempts detection of the PDCCH in a search space set. Here, an attempt to detect the PDCCH in the search space set may be an attempt to detect a candidate of the PDCCH in the search space set, may be an attempt to detect a DCI format in the search space set, may be an attempt to detect the PDCCH in the control resource set, may be an attempt to detect a candidate of the PDCCH in the control resource set, or may be an attempt to detect a DCI format in the control resource set.

The search space set is defined as a set of candidates of the PDCCH. The search space set may be a Common Search Space (CSS) set, or may be a UE-specific Search Space (USS) set. The terminal apparatus 1 attempts detection of candidates of the PDCCH in a part or all of a Type 0 PDCCH common search space set, a Type 0a PDCCH common search space set, a Type 1 PDCCH common search space set, a Type 2 PDCCH common search space set, a Type 3 PDCCH common search space set, and/or a UE-specific PDCCH search space set (UE-specific search space set).

The Type 0 PDCCH common search space set may be used as a common search space set having an index of 0. The Type 0 PDCCH common search space set may be a common search space set having an index of 0.

The CSS set is a general term for the Type 0 PDCCH common search space set, the Type 0a PDCCH common search space set, the Type 1 PDCCH common search space set, the Type 2 PDCCH common search space set, and the Type 3 PDCCH common search space set. The USS set is also referred to as a UE-specific PDCCH search space set.

A certain search space set is related to (included in, corresponds to) a certain control resource set. The index of the control resource set related to the search space set may be indicated by a higher layer parameter.

For a certain search space set, a part or all of 6A to 6C may be indicated by at least a higher layer parameter.

6A) Monitoring interval of the PDCCH (PDCCH monitoring periodicity)
6B) Monitoring pattern of the PDCCH in a slot (PDCCH monitoring pattern within a slot)
6C) Monitoring offset of the PDCCH (PDCCH monitoring offset)

The monitoring occasion of a certain search space set may correspond to the OFDM symbol to which the first OFDM symbol of the control resource set related to the certain search space set is mapped. The monitoring occasion of a certain search space set may correspond to a resource of the control resource set starting from the first OFDM symbol of the control resource set related to the certain search space set. The monitoring occasion of the search space set is given based at least on a part or all of the monitoring interval of the PDCCH, the monitoring pattern of the PDCCH in a slot, and the monitoring offset of the PDCCH.

Figure 8:
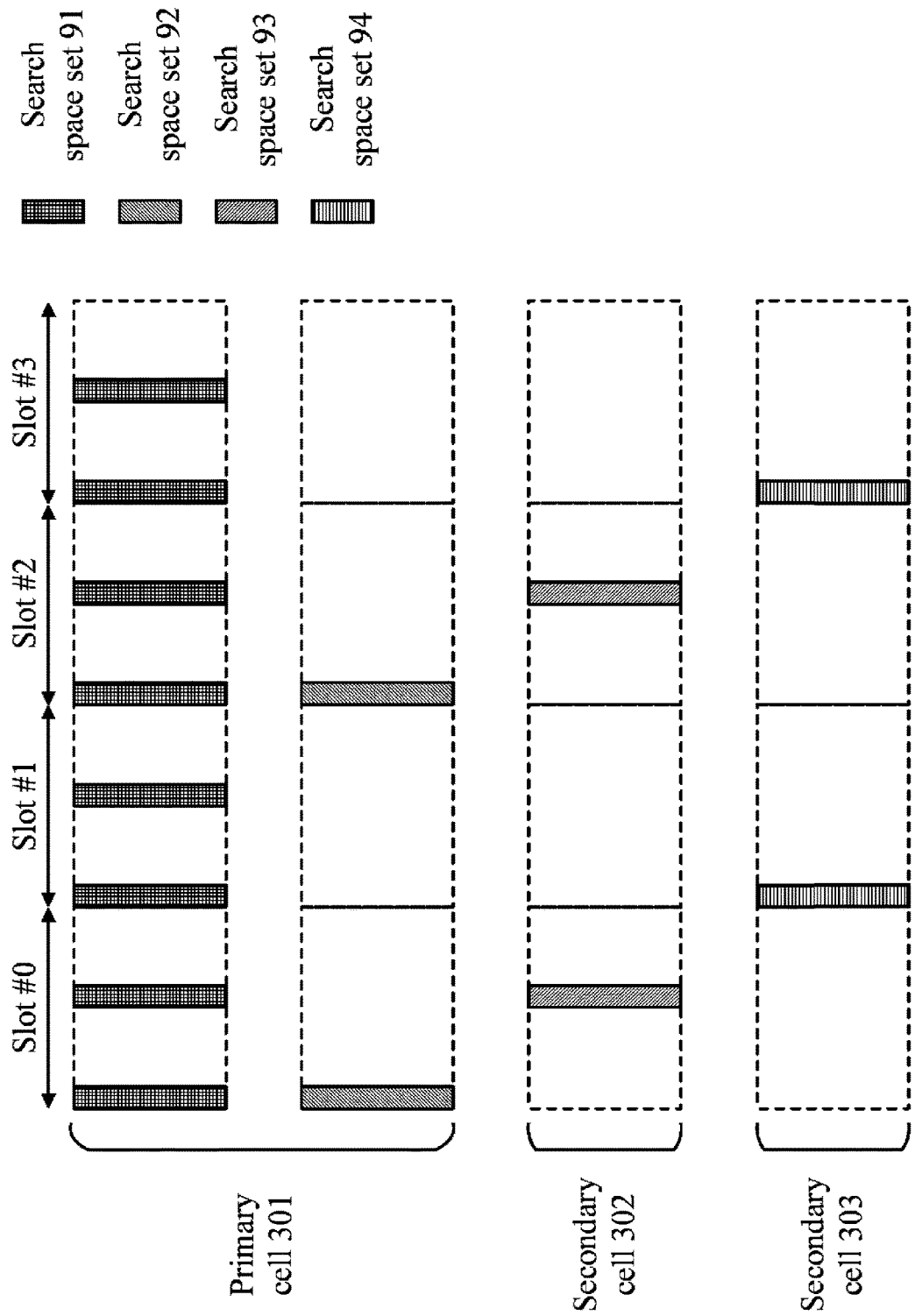
FIG. 8 is a diagram illustrating an example of monitoring occasions for search space sets according to an aspect of the present embodiment.

FIG. 8 is a diagram illustrating an example of the monitoring occasion for the search space set according to an aspect of the present embodiment. In FIG. 8, a search space set 91 and a search space set 92 are configured in a primary cell 301, a search space set 93 is configured in a secondary cell 302, and a search space set 94 is configured in a secondary cell 303.

In FIG. 8, each block hatched with grid lines represents the search space set 91, each block hatched with lines rising diagonally up and to the right represents the search space set 92, each block hatched with lines rising diagonally up and to the left represents the search space set 93, and each block hatched with horizontal lines represents the search space set 94.

The monitoring periodicity of the search space set 91 is set to one slot, the monitoring offset of the search space set 91 is set to zero slots, and the monitoring pattern of the search space set 91 is set to [1, 0, 0, 0, 0, 0, 0, 1, 0, 0, 0, 0, 0, 0]. In other words, the monitoring occasion for the search space set 91 corresponds to the first OFDM symbol (OFDM symbol #0) and the eighth OFDM symbol (OFDM symbol #7) in each of the slots.

The monitoring periodicity of the search space set 92 is set to two slots, the monitoring offset of the search space set 92 is set to zero slots, and the monitoring pattern of the search space set 92 is set to [1, 0, 0, 0, 0, 0, 0, 0, 0, 0, 0, 0, 0, 0]. In other words, the monitoring occasion for the search space set 92 corresponds to the first OFDM symbol (OFDM symbol #0) in each of the even-numbered slots.

The monitoring periodicity of the search space set 93 is set to two slots, the monitoring offset of the search space set 93 is set to zero slots, and the monitoring pattern of the search space set 93 is set to [0, 0, 0, 0, 0, 0, 0, 1, 0, 0, 0, 0, 0, 0]. In other words, the monitoring occasion for the search space set 93 corresponds to the eighth OFDM symbol (OFDM symbol #7) in each of the even-numbered slots.

The monitoring periodicity of the search space set 94 is set to two slots, the monitoring offset of the search space set 94 is set to one slot, and the monitoring pattern of the search space set 94 is set to [1, 0, 0, 0, 0, 0, 0, 0, 0, 0, 0, 0, 0, 0]. In other words, the monitoring occasion for the search space set 94 corresponds to the first OFDM symbol (OFDM symbol #0) in each of the odd-numbered slots.

The Type 0 PDCCH common search space set may be at least used for the DCI format with a Cyclic Redundancy Check (CRC) sequence scrambled with a System Information-Radio Network Temporary Identifier (SI-RNTI).

The Type 0a PDCCH common search space set may be at least used for the DCI format with a Cyclic Redundancy Check (CRC) sequence scrambled with a System Information-Radio Network Temporary Identifier (SI-RNTI).

The Type 1 PDCCH common search space set may be at least used for the DCI format with a CRC sequence scrambled with a Random Access-Radio Network Temporary Identifier (RA-RNTI) and/or a CRC sequence scrambled with a Temporary Cell-Radio Network Temporary Identifier (TC-RNTI).

The Type 2 PDCCH common search space set may be used for the DCI format with a CRC sequence scrambled with a Paging-Radio Network Temporary Identifier (P-RNTI).

The Type 3 PDCCH common search space set may be used for the DCI format with a CRC sequence scrambled with a Cell-Radio Network Temporary Identifier (C-RNTI).

The UE-specific PDCCH search space set may be at least used for the DCI format with a CRC sequence scrambled with a C-RNTI.

In downlink communication, the terminal apparatus 1 detects a downlink DCI format. The detected downlink DCI format is at least used for resource allocation of the PDSCH. The detected downlink DCI format is also referred to as downlink allocation (downlink assignment). The terminal apparatus 1 attempts reception of the PDSCH. Based on the PUCCH resource indicated based on the detected downlink DCI format, the HARQ-ACK corresponding to the PDSCH (HARQ-ACK corresponding to the transport block included in the PDSCH) is reported to the base station apparatus 3.

In uplink communication, the terminal apparatus 1 detects an uplink DCI format. The detected DCI format is at least used for resource allocation of the PUSCH. The detected uplink DCI format is also referred to as an uplink grant. The terminal apparatus 1 performs transmission of the PUSCH.

In the configured scheduling (configured grant), the uplink grant for scheduling the PUSCH is configured for each transmission period of the PUSCH. In a case that the PUSCH is scheduled by the uplink DCI format, a part or all of the information indicated by the uplink DCI format may be indicated by the uplink grant configured in the case of the configured scheduling.

Figure 9:
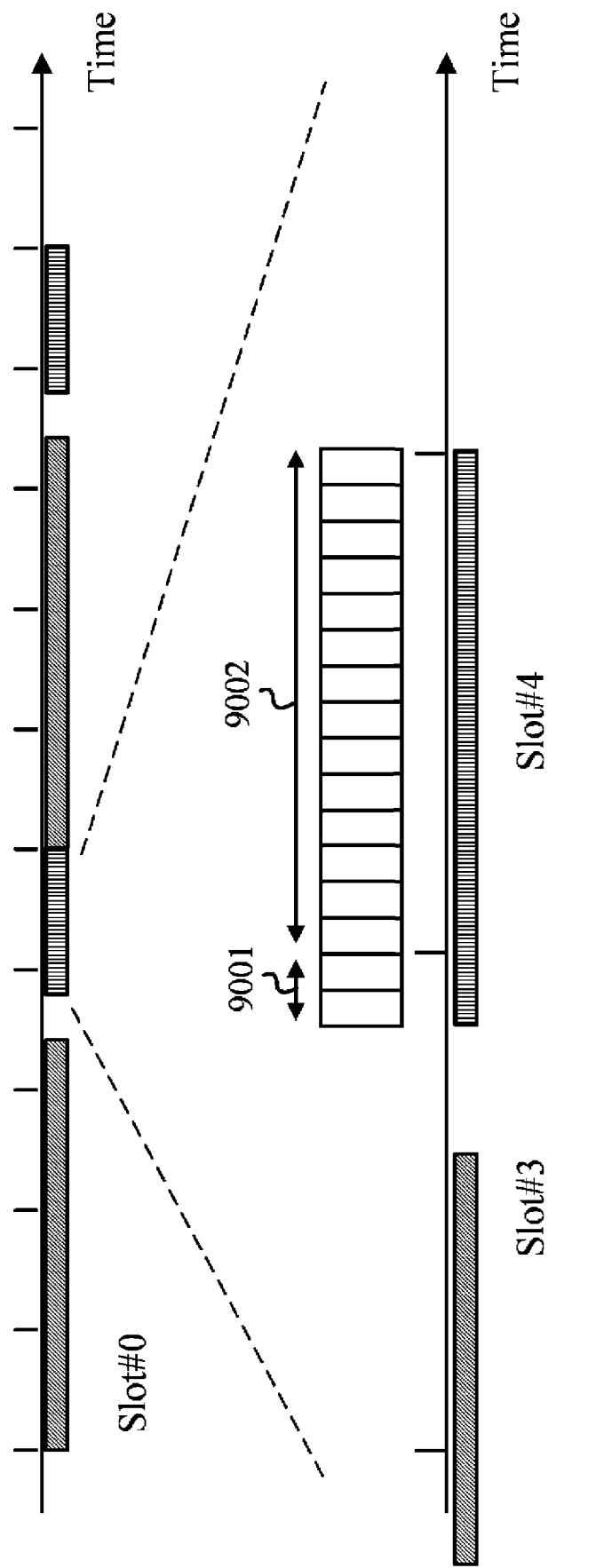
FIG. 9 is a diagram illustrating an example of transmission based on repetition of a PUCCH according to an aspect of the present embodiment.

FIG. 9 is a diagram illustrating an example of transmission based on repetition of the PUCCH according to an aspect of the present embodiment. The repetition of the PUCCH is also referred to as the repetition of UCI. In FIG. 9, the horizontal axis represents the time domain. A grid on a line indicating the time domain indicates boundaries between slots. Here, in the upper part of FIG. 9, the first slot is labeled as slot #0. A hatched block depicted below the line indicating the time domain indicates that the time domain corresponding to the hatched block is a downlink domain. A vertical line block depicted below the line indicating the time domain indicates that the time domain corresponding to the vertical line block is an uplink domain. The lower part of FIG. 9 is an enlarged view of part of slot #3 and slot #4.

In FIG. 9, the PUCCH is allocated to slot #3 and slot #4. Here, 9001 is an instance of the PUCCH allocated to OFDM symbol #12 and OFDM symbol #13 of slot #3. 9002 denotes instances of the PUCCH allocated to OFDM symbols #0 to #13 of slot #4. Preferably, in some scenarios, the PUSCH is segmented for allocation in such a manner that no instance of the PUCCH extends across the boundary between the slots as described above. Here, for example, the instance of the PUCCH may be one PUCCH. For example, the instance of the PUCCH may be one of repetitions of the PUCCH (Repetition).

Figure 10:
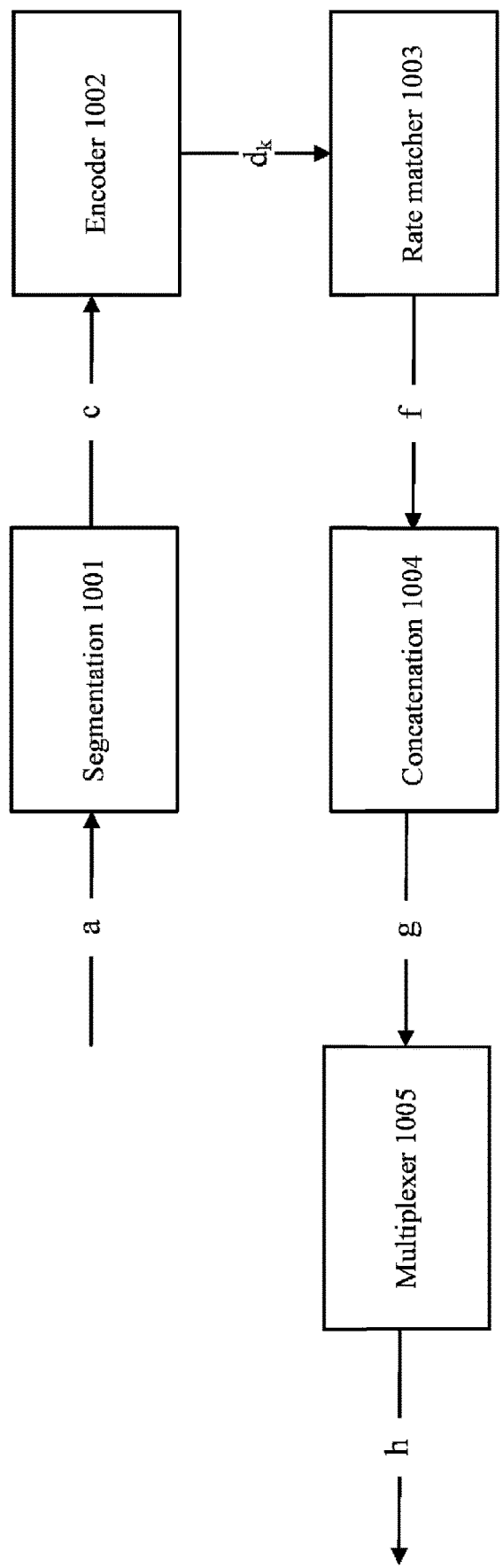
FIG. 10 is a diagram illustrating a configuration example of a baseband unit 13 of the terminal apparatus 1 according to an aspect of the present embodiment.

FIG. 10 is a diagram illustrating a configuration example of the baseband unit 13 of the terminal apparatus 1 according to an aspect of the present embodiment. The baseband unit 13 includes at least some or all of a segmentation unit 1001, a coder (encoder) 1002, a rate matcher 1003, a concatenation unit 1004, and a multiplexer 1005. In a case that a certain unit is not included in the baseband unit, the certain unit may be considered to be short-circuited. For example, in a case that the baseband unit 13 includes the coder 1002, the rate matcher 1003, and the multiplexer 1004, the segmentation unit 1001 may be considered to be short-circuited. Here, with the segmentation unit 1001 short-circuited, a may be input to c. With the concatenation unit 1004 short-circuited, h may be input to f.

In FIG. 10, a denotes a bit sequence of the uplink control information. The bit sequence a includes $a_0, a_1, \ldots, a_{A-1}$. Here, $a_k$ (k is an integer ranging from 0 to A−1) indicates the k-th bit of the bit sequence of the uplink control information. The bit sequence a is input to the segmentation unit 1001. A denotes the number of bits of the uplink control information.

Figure 11:
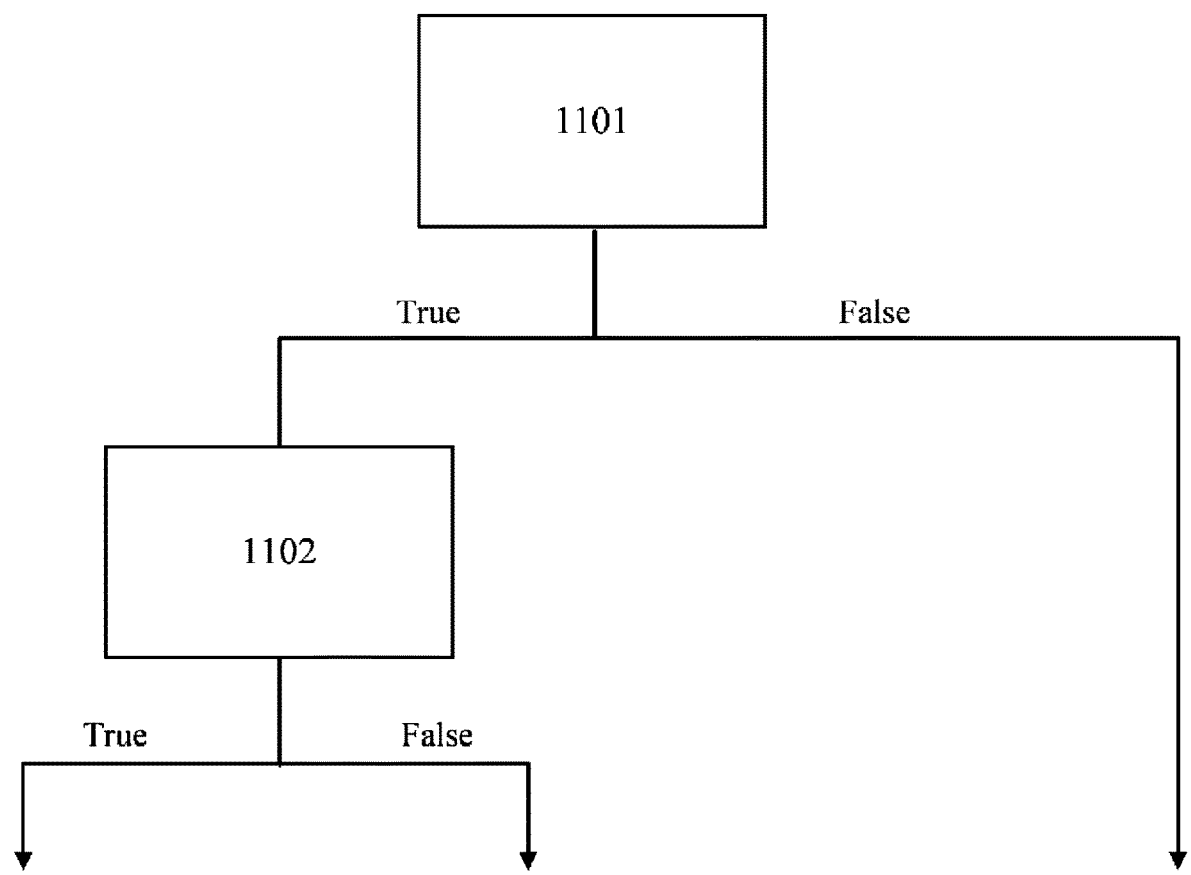
FIG. 11 is a diagram illustrating an operation example of a segmentation unit 1001 according to an aspect of the present embodiment.

FIG. 11 is a diagram illustrating an operation example of the segmentation unit 1001 according to an aspect of the present embodiment. A condition 1101 is that A is 12 or more. In a case that A is greater than or equal to 12, the operation proceeds to evaluation of a condition 1102. The condition 1102 is that at least one of a condition 1102a and a condition 1102b is satisfied. The condition 1102a is that A is 360 or more and that E is 1088 or less. The condition 1102b is that A is 1013 or more. Here, E denotes the length of a rate matching output sequence. The rate matching output sequence will be described below.

With the condition 1102 satisfied, the segmentation unit 1001 segments a bit sequence a to generate $C_{UCI}$ code blocks. A CRC sequence is generated for each of the generated $C_{UCI}$ code blocks. Here, assuming that an index r is assigned to each of the $C_{UCI}$ code blocks, a bit sequence c for a code block r output from the segmentation unit 1001 is a sequence including a code block with the index r to which a CRC sequence is added.

With the condition 1102 not satisfied, the segmentation unit 1001 does not segment the bit sequence a, but generates a CRC sequence for the bit sequence a. Here, the bit sequence c output from the segmentation unit 1001 includes the bit sequence a to which a CRC sequence is added.

With the condition 1101 not satisfied, the segmentation unit 1001 does not segment the bit sequence a nor generate a CRC sequence. Here, the bit sequence c output from the segmentation unit 1001 is equal to the bit sequence a.

The bit sequence c for the code block r includes $c_0, c_1, \ldots, c_{K-1}$. Here, $c_k$ (k is an integer ranging from 0 to K−1) indicates the k-th coded bit of the bit sequence c. The bit sequence c for the code block r is input to the coder 1002. K denotes the number of bits of the bit sequence for the code block r.

The coder 1002 codes the bit sequence c to generate a coded bit sequence d. The coding scheme used in the coder 1002 may be determined based on at least the number of bits A of the uplink control information. For example, with the condition 1101 satisfied, the coding scheme used in the coder 1002 may be a polar code. With the condition 1101 not satisfied, the coding scheme used in the coder 1002 may be either a Reed-Muller code or a repetition code.

FIG. 12 is a diagram illustrating an example of a determination procedure for a variable n used for coding with the polar code according to an aspect of the present embodiment. In procedure P1, in a case that E is equal to or less than $(9/8)*2\hat{\,}(\text{ceil}(\log 2 (E))-1)$ and K/E is less than 9/16, procedure P2 is executed. In a case that E is not less than or equal to $(9/8)*2\hat{\,}(\text{ceil}(\log 2 (E))-1)$ and/or K/E is not less than 9/16, procedure P4 is executed. In other words, in procedure P1, the variable n may be determined based on at least one or both of K and E. In procedure P1, an array used for polar coding may be determined based on at least one or both of K and E.

In procedure P2, ceil (log 2 (E)−1) is input to a variable $n_1$.

In procedure P4, ceil (log 2 (E)) is input to the variable $n_1$.

In procedure P6, 1/8 is input to $R_{min}$.

In procedure P7, ceil (log 2 ($K/R_{min}$)) is input to a variable $n_2$.

In procedure P8, max (min ($n_1$, $n_2$, $n_{max}$), $n_{min}$) is input to the variable n.

Here, $n_{min}$ is 5. $n_{max}$ is 10.

Based on at least the value of the variable n determined in procedure P8, the number of coded bits N after polar coding is determined by N=2 ^n. The number of coded bits N corresponds to the size of an array used for polar coding. The array used for polar coding may be determined based on at least the number of coded bits N. Here, the array used for polar coding is also referred to as a matrix, a polarization matrix, or the like. The array used for polar coding may be an array calculated based on the Kronecker product of a matrix G=[1, 0; 1, 1].

In a case that K is 1, N is set to $Q_m$. Here, $Q_m$ denotes the order of a modulation scheme for the PUCCH. In a case that K is 2, N is set to $3*Q_m$.

In a case that K is 3 or more and 11 or less, N is set to 32. In a case that K is 3 or more and 11 or less, the Reed-Muller code may be used to code the bit sequence c.

The coded bit sequence d for the bit sequence c includes $d_0, d_1, \ldots, d_{N-1}$. Here, $d_k$ (k is an integer ranging from 0 to N−1) denotes the k-th coded bit of the coded bit sequence d. The coded bit sequence d is input to the rate matcher 1003.

The rate matcher 1003 applies a part or all of the interleaver and bit selection to input coded bit sequence d to generate a rate matching sequence f. The rate matching sequence f includes $f_0, f_1, \ldots, f_{E-1}$. Here, $f_k$ (k is an integer ranging from 0 to E−1) denotes the k-th coded bit of the rate matching sequence f. The rate matching sequence f is input to the concatenation unit 1004.

The length E of the rate matching output sequence may be determined based on at least the number of resource elements of the PUCCH instance. The rate matching output sequence E may be determined by $E=E_{UCI}/C_{UCI}$.

$E_{UCI}$ may be determined based on at least a combination of uplink control information transmitted on the PUCCH. For example, in a case that the uplink control information transmitted on the PUCCH is HARQ-ACK, $E_{UCI}$ may be $E_{tot}$. For example, in a case that the uplink control information transmitted on the PUCCH is HARQ-ACK and SR, $E_{UCI}$ may be $E_{tot}$. For example, in a case that the uplink control information transmitted on the PUCCH is CSI, $E_{UCI}$ may be $E_{tot}$. For example, in a case that the uplink control information transmitted on the PUCCH is HARQ-ACK and CSI, $E_{UCI}$ may be $E_{tot}$. For example, in a case that the uplink control information transmitted on the PUCCH is HARQ-ACK, SR, and CSI, $E_{UCI}$ may be $E_{tot}$. Here, the CSI is assumed not to be segmented into two parts (two part CSI). A method of determining Eta will be described below.

For example, in a case that the uplink control information transmitted on the PUCCH includes at least CSI and the CSI is segmented into two parts, then for a first CSI part, $E_{UCI}$ may be min ($E_{tot}$, ceil (($O^{ACK}+O^{SR}+O^{CSI-part1}+L)/R^{max}_{UCI}/Q_m)*Q^m$). For a second CSI part, $E_{UCI}$ may be $E_{tot}$−min ($E_{tot}$, ceil (($O^{CSI-part1}+L)/R^{max}_{UCI}/Q_m)*Q_m$). Here, in a case that A is 360 or more, L is 11. In a case that A is not 360 or more, L denotes the number of bits of the CRC sequence. With no CRC sequence generated, L is 0. $O^{ACK}$ denotes the number of bits of HARQ-ACK. In a case that the uplink control information transmitted on the PUCCH does not include the HARQ-ACK, $O_{ACK}$ is 0. $O^{SR}$ denotes the number of bits of the SR. In a case that the uplink control information transmitted on the PUCCH includes no SR, $O^{SR}$ is 0. $O^{CSI-part1}$ denotes the number of bits of the first CSI part. $R^{max}_{UCI}$ denotes the maximum coding rate configured for the PUCCH format.

For PUCCH format 2, $E_{tot}$ is $16*N^{PUCCH, 2}_{symb, UCI}*N^{PUCCH, 2}_{PRB}$. For PUCCH format 3, $E_{tot}$ is $12*Q_m*N^{PUCCH, 3}_{symb, UCI}*N^{PUCCH, 3}_{PRB}$. For PUCCH format 4, $E_{tot}$ is $12*Q_m*N^{PUCCH, 4}_{symb, UCI}/N^{PUCCH, 4}_{SF}$. Here, $N^{PUCCH, 2}_{symb, UCI}$ denotes the number of OFDM symbols included in PUCCH format 2 and carrying uplink control information. $N^{PUCCH, 3}_{symb, UCI}$ denotes the number of OFDM symbols included in PUCCH format 3 and carrying uplink control information. $N^{PUCCH, 4}_{symb, UCI}$ denotes the number of OFDM symbols included in PUCCH format 4 and carrying uplink control information. $N^{PUCCH, 2}_{PRB}$ denotes the number of resource blocks determined for transmission of PUCCH format 2. $N^{PUCCH, 3}_{PRB}$ denotes the number of resource blocks determined for transmission of PUCCH format 3. $N^{PUCCH, 4}_{SF}$ denotes a spreading factor configured for PUCCH format 4.

In this way, the length E of the rate matching output sequence is determined based on at least some or all of the modulation scheme for the PUCCH, the number of resource blocks determined for transmission of the PUCCH, the number of OFDM symbols carrying uplink control information, the maximum coding rate configured for the PUCCH format, and the spreading factor configured for the PUCCH format. In other words, for repetition transmission of the PUCCH as illustrated in FIG. 9, a different number of code blocks and/or a different length of a rate matching output sequence may be determined for each PUCCH instance. In a case that that the number of code blocks and/or the length of the rate matching output sequence varies with each PUCCH instance, this may cause that the coding procedure executed by the coder 1002 may vary with each PUCCH instance.

For example, the rate matcher 1003 may determine the length E of the rate matching output sequence for every multiple PUCCH instances. On the other hand, the segmentation unit 1001 may assume one value as the length of the rate matching output sequence for each of the multiple PUCCH instances. The coder 1002 may assume one value as the length of the rate matching output sequence for each of the multiple PUCCH instances.

For example, the base station apparatus 3 may use one DCI format to trigger the transmission of S PUCCH instances to the terminal apparatus 1 for the transmission of the uplink control information. Here, S may be an integer of 2 or more. S may be 1 in some cases. Here, the rate matcher 1003 may determine the length $E_s$ of the rate matching output sequence determined for the s-th PUCCH instance of the S PUCCH instances. Here, based on the determined $E_s$, an operation of bit selection may be performed for the s-th PUCCH instance. Here, s is an integer ranging from 0 to S−1. Note that some of the S PUCCH instances may be scheduled by one DCI format, whereas others of the S PUCCH instances may be scheduled by another DCI format.

For example, the segmentation unit 1001 may select the maximum value of $E_s$ and assume the selected maximum value to be the length E of the rate matching output sequence. Alternatively, the segmentation unit 1001 may determine the average value of $E_s$ and assume the determined average value to be the length E of the rate matching output sequence. The segmentation unit 1001 may select the minimum value of $E_s$ and assume the selected minimum value to be the length E of the rate matching output sequence. The segmentation unit 1001 may also determine the sum of $E_s$ and assume the determined sum to be the length E of the rate matching output sequence. In other words, for example, the segmentation unit 1001 may determine the assumed length E of the rate matching output sequence based on at least each of the lengths $E_s$ of the rate matching output sequence. For example, the segmentation unit 1001 may determine the assumed length E of the rate matching output sequence by using at least two or more of the lengths $E_s$ of the S rate matching output sequences. For example, the segmentation unit 1001 may perform coding based on the assumed length E of the rate matching output sequence.

For example, the segmentation unit 1001 may select the maximum value of $E_s$ for the respective multiple PUCCH instances and assume the selected maximum value to be the length E of the rate matching output sequence. The segmentation unit 1001 may select the maximum value of $E_s$ for each of multiple PUCCH repetitions for one PUCCH and assume the selected maximum value to be the length E of the rate matching output sequence.

The segmentation unit 1001 may determine the average value of $E_s$ for the respective multiple PUCCH instances, and assume the determined average value to be the length E of the rate matching output sequence. The segmentation unit 1001 may determine the average value of $E_s$ for the respective multiple PUCCH repetitions for one PUCCH and may assume the determined average value to be the length E of the rate matching output sequence.

The segmentation unit 1001 may select the minimum value of $E_s$ for the respective multiple PUCCH instances and assume the selected minimum value to be the length E of the rate matching output sequence. The segmentation unit 1001 may select the minimum value of $E_s$ for the respective multiple PUCCH repetitions for one PUCCH and assume the selected minimum value to be the length E of the rate matching output sequence.

The segmentation unit 1001 may determine the sum of $E_s$ for the respective multiple PUCCH instances and assume the determined sum to be the length E of the rate matching output sequence. The segmentation unit 1001 may determine the sum of $E_s$ for the respective multiple PUCCH repetitions for one PUCCH and assume the determined sum to be the length E of the rate matching output sequence.

In other words, for example, the segmentation unit 1001 may determine the assumed length E of the rate matching output sequence based on at least each of the lengths $E_s$ of the rate matching output sequences for the respective multiple PUCCH instances. The segmentation unit 1001 may determine the length E of the rate matching output sequence assumed for one PUCCH based on at least each of the lengths $E_s$ of the rate matching output sequences for the respective multiple PUCCH repetitions for one PUCCH.

For example, the segmentation unit 1001 may determine the length E of the assumed rate matching output sequence by using at least two or more of the lengths $E_s$ of the S rate matching output sequences for the respective multiple PUCCH instances. The segmentation unit 1001 may determine the length E of the rate matching output sequence assumed for one PUCCH by using at least two or more of the lengths $E_s$ of the S rate matching output sequences for the respective multiple PUCCH repetitions for one PUCCH.

For example, the segmentation unit 1001 may perform coding based on the length E of the rate matching output sequence assumed for one PUCCH.

For example, the segmentation unit 1001 may select the length $E_0$ of the rate matching output sequence for the first PUCCH instance #0 among the lengths $E_s$ of the S rate matching output sequences for the respective multiple PUCCH instances, and assume that $E_0$ to be the length E of the rate matching output sequence. For example, the segmentation unit 1001 may select the length $E_1$ of the rate matching output sequence for the second PUCCH instance #1 among the lengths $E_s$ of the S rate matching output sequences for the respective multiple PUCCH instances, and may assume the $E_1$ to be the length E of the rate matching output sequence. For example, the segmentation unit 1001 may select the length $E_{S-1}$ of the rate matching output sequence for the last PUCCH instance #S-1 among the lengths $E_s$ of the S rate matching output sequence for the respective multiple PUCCH instances, and assume that $E_{S-1}$ to be the length E of the rate matching output sequence.

For example, the length E of the rate matching output sequence assumed by the segmentation unit 1001 may be determined based on RRC signaling. The length E of the rate matching output sequence assumed by the segmentation unit 1001 may be indicated by RRC signaling. For example, the length E of the rate matching output sequence assumed by the segmentation unit 1001 may be determined based on the DCI format used for scheduling the S PUCCH instances. The length E of the rate matching output sequence assumed by the segmentation unit 1001 may be indicated by the DCI format used for scheduling the S PUCCH instances.

For example, the segmentation unit 1001 may select one value as a parameter used to determine the length E of the rate matching output sequence for each of the S PUCCH instances. For example, the segmentation unit 1001 may select any one of the numbers of OFDM symbols included in the respective S PUCCH instances. The segmentation unit 1001 may determine the length E of the rate matching output sequence by using the selected one number. For example, the segmentation unit 1001 may select the largest one of the numbers of OFDM symbols included in the respective S PUCCH instances to determine the length E of the rate matching output sequence. For example, the segmentation unit 1001 may select the smallest one of the numbers of OFDM symbols included in the respective S PUCCH instances to determine the length E of the rate matching output sequence. For example, the segmentation unit 1001 may determine the average value of the numbers of OFDM symbols included in the respective S PUCCH instances to determine the length E of the rate matching output sequence. For example, the segmentation unit 1001 may determine the sum of the numbers of OFDM symbols included in the respective S PUCCH instances to determine the length E of the rate matching output sequence. For example, the segmentation unit 1001 may select the number $N_0$ of OFDM symbols included in the first PUCCH instance #0 among the numbers $N_s$ of OFDM symbols included in the respective S PUCCH instances to determine the length E of the rate matching output sequence by using the selected number $N_0$. For example, the segmentation unit 1001 may select the number Ni of OFDM symbols included in the second PUCCH instance #1 among the numbers of OFDM symbols included in the respective S PUCCH instances to determine the length E of the rate matching output sequence by using the selected number Ni. For example, the segmentation unit 1001 may select the number $N_{S-1}$ of OFDM symbols included in the last PUCCH instance #S-1 among the numbers of OFDM symbols included in the respective S PUCCH instances to determine the length E of the rate matching output sequence by using the selected $N_{S-1}$. Here, $N_s$ denotes the number of OFDM symbols included in a PUCCH instance #s. Note that $N_s$ may denote a number obtained by subtracting the number of OFDM symbols for the DMRS included in the PUCCH instance #s from the number of OFDM symbols included in the PUCCH instance #s. $N_s$ may denote the number of OFDM symbols included in the PUCCH instance #s and carrying the UCI.

For example, the segmentation unit 1001 may select any one of the numbers of resource blocks included in the respective S PUCCH instances. The segmentation unit 1001 may determine the length E of the rate matching output sequence by using the selected one number. For example, the segmentation unit 1001 may select the largest of the numbers of resource blocks included in the respective S PUCCH instances to determine the length E of the rate matching output sequence by using the largest number. For example, the segmentation unit 1001 may select the smallest of the numbers of resource blocks included in the respective S PUCCH instances to determine the length E of the rate matching output sequence by using the smallest number. For example, the segmentation unit 1001 may determine the average value of the numbers of resource blocks included in the respective S PUCCH instances to determine the length E of the rate matching output sequence by using the determined average value. For example, the segmentation unit 1001 may determine the sum of the numbers of resource blocks included in the respective S PUCCH instances to determine the length E of the rate matching output sequence by using the determined sum. For example, the segmentation unit 1001 may determine the rate matching output sequence E by using the number $R_0$ of resource blocks included in the first PUCCH instance #0 among the numbers $R_s$ of resource blocks included in the respective S PUCCH instances. For example, the segmentation unit 1001 may determine the length E of the rate matching output sequence by using the number $R_1$ of resource blocks included in the second PUCCH instance #1 among the numbers $R_s$ of resource blocks included in the respective S PUCCHs. For example, the segmentation unit 1001 may determine the length E of the rate matching output sequence by using the number $R_{S-1}$ of resource blocks included in the last PUCCH instance #S−1 among the numbers $R_s$ of resource blocks included in the respective S PUCCHs. Here, $R_s$ denotes the number of resource blocks included in the PUCCH instance #s. $R_s$ may denote the number of resource blocks transmitted in the PUCCH instance #s.

For example, the segmentation unit 1001 may select any one of the PUCCH formats included in the respective S PUCCH instances. The segmentation unit 1001 may determine the length E of the rate matching output sequence by using the configuration of the selected one PUCCH format. For example, the segmentation unit 1001 may determine the length E of the rate matching output sequence by using the index $F_0$ of the PUCCH format included in first PUCCH instance #0 among PUCCH formats $F_s$ included in the respective S PUCCH instances. For example, the segmentation unit 1001 may determine the length E of the rate matching output sequence by using the second PUCCH instance #1 among the PUCCH formats $F_s$ included in the respective S PUCCH instances. For example, the segmentation unit 1001 may determine the length E of the rate matching output sequence by using the index $F_{S-1}$ of the PUCCH format included in the last PUCCH instance #S−1 among the PUCCH formats $F_s$ included in the respective S PUCCH instances. Here, $F_s$ denotes the index of the PUCCH format included in the s-th PUCCH instance.

The segmentation unit 1001 may determine the number of code blocks for polar coding for the S PUCCH instances by using the assumed length E of the rate matching output sequence. The segmentation unit 1001 may determine the number of code blocks for polar coding for the S PUCCH instances by using the selected length E of the rate matching output sequence. The segmentation unit 1001 may determine the number of code blocks for polar coding for the S PUCCH instances by using the determined length E of the rate matching output sequence. Here, the bit sequence c of the uplink control information transmitted in the S PUCCH instances may be generated based on the determined number of code blocks.

For example, the segmentation unit 1001 and the rate matcher 1003 may determine the length E of the rate matching output sequence by different methods. For example, the segmentation unit 1001 may determine the length of the first rate matching output sequence. The length of the first rate matching output sequence may be commonly used for each of the S PUCCH instances. On the other hand, the rate matcher 1003 may determine the length $E^{1003}$ of the second rate matching output sequence. Here, the length $E^{1003}$ of the second rate matching output sequence may be determined for each of the S PUCCH instances.

The segmentation unit 1001 may determine the number of code blocks $C_{UCI}$ for the S PUCCH instances by using the assumed length E of the rate matching output sequence. The segmentation unit 1001 may determine the number of code blocks $C_{UCI}$ for the S PUCCH instances by using the length E of the selected rate matching output sequence. The segmentation unit 1001 may determine the number of code blocks $C_{UCI}$ for the S PUCCH instances by using the determined length E of the rate matching output sequence.

For example, the coder 1002 may select the maximum value of $E_s$ and assume the selected maximum value to be the length E of the rate matching output sequence. The coder 1002 may determine the average value of $E_s$ and assume the determined average value to be the length E of the rate matching output sequence. The coder 1002 may select the minimum value of $E_s$ and assume the selected minimum value to be the length E of the rate matching output sequence. The coder 1002 may determine the sum of $E_s$ and assume the determined sum to be the length E of the rate matching output sequence. In other words, for example, the coder 1002 may determine the assumed length E of the rate matching output sequence based on at least each of the lengths $E_s$ of the rate matching output sequences. For example, the coder 1002 may determine the assumed length E of the rate matching output sequence by using at least two or more of the lengths $E_s$ of the S rate matching output sequences. For example, the coder 1002 may perform coding based on the assumed length E of the rate matching output sequence.

For example, the coder 1002 may select the maximum value of $E_s$ for the respective multiple PUCCH instances and assume the selected maximum value to be the length E of the rate matching output sequence. The coder 1002 may select a maximum value of $E_s$ for the respective multiple PUCCH repetitions for one PUCCH and assume the selected maximum value to be the length E of the rate matching output sequence.

The coder 1002 may determine the average value of $E_s$ for the respective multiple PUCCH instances, and may assume the determined average value to be the length E of the rate matching output sequence. The coder 1002 may determine the average value of $E_s$ for the respective multiple PUCCH repetitions for one PUCCH and may assume the determined average value to be the length E of the rate matching output sequence.

The coder 1002 may select the minimum value of $E_s$ for the respective multiple PUCCH instances and assume the selected minimum value to be the length E of the rate matching output sequence. The coder 1002 may select the minimum value of $E_s$ for the respective multiple PUCCH repetitions for one PUCCH and assume the selected minimum value to be the length E of the rate matching output sequence.

The coder 1002 may determine the sum of $E_s$ for the respective multiple PUCCH instances and assume the determined sum to be the length E of the rate matching output sequence. The coder 1002 coder 1002 may determine the sum of $E_s$ for the respective multiple PUCCH repetitions for one PUCCH and assume the determined sum to be the length E of the rate matching output sequence.

In other words, for example, the coder 1002 may determine the assumed length E of the rate matching output sequence based on at least each of the lengths $E_s$ of the rate matching output sequences for the respective multiple PUCCH instances. The coder 1002 may determine the length E of the rate matching output sequence assumed for one PUCCH based on at least each of the lengths $E_s$ of the rate matching output sequences for the respective multiple PUCCH repetitions for one PUCCH.

For example, the coder 1002 may determine the length E of the assumed rate matching output sequence by using at least two or more of the lengths $E_s$ of the S rate matching output sequences for the respective multiple PUCCH instances. The coder 1002 may determine the length E of the rate matching output sequence assumed for one PUCCH using at least two or more of the lengths $E_s$ of the S rate matching output sequences for the respective multiple PUCCH repetitions for one PUCCH.

For example, the coder 1002 may perform coding based on the length E of the rate matching output sequence assumed for one PUCCH.

For example, the coder 1002 may select the length $E_0$ of the rate matching output sequence for the first PUCCH instance #0 among the lengths $E_s$ of the S rate matching output sequences for the respective multiple PUCCH instances, and assume $E_0$ to be the length E of the rate matching output sequence. For example, the coder 1002 may select the length $E_1$ of the rate matching output sequence for the second PUCCH instance #1 among the lengths $E_s$ of the S rate matching output sequences for the respective multiple PUCCH instances, and assume $E_1$ to be the length E of the rate matching output sequence. For example, the coder 1002 may select the length $E_{S-1}$ of the rate matching output sequence for the last PUCCH instance #S−1 among the lengths $E_s$ of the S rate matching output sequences for the respective multiple PUCCH instances, and assume $E_{S-1}$ to be the length E of the rate matching output sequence.

For example, the length E of the rate matching output sequence assumed by the coder 1002 may be determined based on RRC signaling. Alternatively, the length E of the rate matching output sequence assumed by the coder 1002 may be indicated by RRC signaling. For example, the length E of the rate matching output sequence assumed by the coder 1002 may be determined based on the DCI format used for scheduling the S PUCCH instances. The length E of the rate matching output sequence assumed by the coder 1002 may be indicated by the DCI format used for scheduling the S PUCCH instances.

For example, the coder 1002 may select one value as a parameter used to determine the length E of the rate matching output sequence for each of the S PUCCH instances. For example, the coder 1002 may select any one of the numbers of OFDM symbols included in the respective S PUCCH instances. The coder 1002 may determine the length E of the rate matching output sequence by using the selected one number. For example, the coder 1002 may select the largest one of the numbers of OFDM symbols included in the respective S PUCCH instances to determine the length E of the rate matching output sequence. For example, the coder 1002 may select the smallest one of the numbers of OFDM symbols included in the respective S PUCCH instances to determine the length E of the rate matching output sequence. For example, the coder 1002 may determine the average value of the numbers of OFDM symbols included in the respective S PUCCH instances to determine the length E of the rate matching output sequence. For example, the coder 1002 may determine the sum of the numbers of OFDM symbols included in the respective S PUCCH instances to determine the length E of the rate matching output sequence. For example, the coder 1002 may select the number $N_0$ of OFDM symbols included in the first PUCCH instance #0 from the numbers Ns of OFDM symbols included in the respective S PUCCH instances to determine the length E of the rate matching output sequence by using the selected number $N_0$. For example, the coder 1002 may select the number Ni of OFDM symbols included in the second PUCCH instance #1 from among the numbers of OFDM symbols included in the respective S PUCCH instances to determine the length E of the rate matching output sequence by using the selected number Ni. For example, the coder 1002 may select the number Ns of OFDM symbols included in the last PUCCH instance #S−1 from among the numbers of OFDM symbols included in the respective S PUCCH instances to determine the length E of the rate matching output sequence by using the selected $N_{S-1}$.

For example, the coder 1002 may select any one of the numbers of resource blocks included in the respective S PUCCH instances. The coder 1002 may determine the length E of the rate matching output sequence using the selected one number. For example, the coder 1002 may select the largest of the numbers of resource blocks included in the respective S PUCCH instances to determine the length E of the rate matching output sequence by using the largest number. For example, the coder 1002 may select the smallest of the numbers of resource blocks included in the respective S PUCCH instances to determine the length E of the rate matching output sequence by using the smallest number. For example, the coder 1002 may determine the average value of the numbers of resource blocks included in the respective S PUCCH instances to determine the length E of the rate matching output sequence by using the determined average value. For example, the coder 1002 may determine the sum of the numbers of resource blocks included in the respective S PUCCH instances to determine the length E of the rate matching output sequence by using the determined sum. For example, the coder 1002 may determine the rate matching output sequence E using the number $R_0$ of resource blocks included in the first PUCCH instance #0 among the numbers $R_s$ of resource blocks included in the respective S PUCCH instances. For example, the coder 1002 may determine the length E of the rate matching output sequence by using the number $R_1$ of resource blocks included in the second PUCCH instance #1 the among the numbers $R_s$ of resource blocks included in the respective S PUCCHs. For example, the coder 1002 may determine the length E of the rate matching output sequence by using the number $R_{S-1}$ of resource blocks included in the last PUCCH instance #S−1 among the numbers $R_s$ of resource blocks included in the respective S PUCCHs.

For example, the coder 1002 may select any one of the PUCCH formats included in the respective S PUCCH instances. The coder 1002 may determine the length E of the rate matching output sequence by using the configuration of the selected one PUCCH format. For example, the coder 1002 may determine the length E of the rate matching output sequence by using the index $F_0$ of the PUCCH format included in the first PUCCH instance #0 among the PUCCH formats $F_s$ included in the respective S PUCCH instances. For example, the coder 1002 may determine the length E of the rate matching output sequence by using the second PUCCH instance #1 among the PUCCH formats $F_s$ included in the respective S PUCCH instances. For example, the coder 1002 may determine the length E of the rate matching output sequence by using the index $F_{S-1}$ of the PUCCH format included in the last PUCCH instance #S−1 among the PUCCH formats $F_s$ included in the respective S PUCCH instances. Here, $F_s$ denotes the index of the PUCCH format included in the s-th PUCCH instance.

The coder 1002 may use the length E of the assumed rate matching output sequence to determine the array used for polar coding for the S PUCCH instances. The coder 1002 may use the length E of the selected rate matching output sequence to determine the array used for polar coding for the S PUCCH instances. The coder 1002 may use the determined length E of the rate matching output sequence to determine the array used for polar coding for the S PUCCH instances. Here, the bit sequence c of the uplink control information transmitted in the S PUCCH instances may be coded by using the determined array.

For example, the coder 1002 and the rate matcher 1003 may determine the length E of the rate matching output sequence by different methods. For example, the coder 1002 may determine the length $E^{1002}$ of the third rate matching output sequence. Here, the length $E^{1002}$ of the third rate matching output sequence may be commonly used for each of the S PUCCH instances. On the other hand, the rate matcher 1003 may determine the length $E^{1003}$ of the second rate matching output sequence. Here, the length $E^{1003}$ of the second rate matching output sequence may be determined for each of the S PUCCH instances.

In the polar code, a coded bit sequence y may be generated by applying a first interleaver to the coded bit sequence d. The coded bit sequence y includes $y_0, y_1, \ldots, y_{N-1}$. Here, $y_k$ (k is an integer ranging from 0 to N−1) indicates the k-th coded bit of the coded bit sequence y. In a case that the first interleaver is not applied to the coded bit sequence d, the coded bit sequence d may be input to the coded bit sequence y.

The first interleaver may be implemented by inputting a coded bit $d_{J(k)}$ to the coded bit $y_k$. Here, J(k) is a function for the first interleaver. J(k)=k may mean that the first interleaver is not applied.

In the polar code, a coded bit sequence e may be generated by applying bit selection to the coded bit sequence y. The coded bit sequence e includes $e_0, e_1, \ldots, e_{E-1}$. Here, $e_k$ (k is an integer ranging from 0 to E−1) denotes the k-th coded bit of the coded bit sequence e.

In polar codes, in a case that E is N or more, a first method of bit selection may be applied. In the first method of bit selection, $y_{mod\ (k,\ N)}$ is input to the coded bits $e_k$. In the first method of bit selection, the domain of k is an integer ranging from 0 to E−1. The first method of bit selection is also referred to as repetition.

In the polar code, in a case that E is not N or more and that K/E is 7/16 or less, a second method of bit selection may be applied. In the second method of bit selection, $y_{k+N-E}$ is input to the coded bit $e_k$. In the second method of bit selection, the domain of k is an integer ranging from 0 to E−1. The second method of bit selection is also referred to as puncturing.

In the polar code, in a case that E is not N or more and that K/E is 7/16 or less, a third method of bit selection may be applied. In the third method of bit selection, the coded bit $y_k$ is input to the coded bit $e_k$. In the third method of bit selection, the domain of k is an integer ranging from 0 to E−1. The third method of bit selection is also referred to as shortening.

In other words, for example, in the polar code, the bit selection method may be determined based on at least some or all of K, E, and N.

In the polar code, the interleaver may be applied to the coded bit sequence e to generate a coded bit sequence f. In a case that the interleaver is not applied to the coded bit sequence e, the coded bit sequence e may be input to the coded bit sequence f.

In the Reed-Muller code, the interleaver need not be applied to the coded bit sequence d. In other words, a coded bit $d_k$ may be input to the coded bit $y_k$.

In the Reed-Muller code, the first method of bit selection may be applied. In other words, $y_{mod\ (k,\ N)}$ is input to a coded bit $f_k$ by the first method of bit selection.

The concatenation unit 1004 may concatenate coded bits $f_k$ corresponding to respective $C_{UCI}$ code blocks to generate coded bits $g_k$. In a case that the segmentation unit 1001 does not segment the bit sequence into multiple code blocks, the coded bit $f_k$ may be input to coded bit $g_k$.

The multiplexer 1005 multiplexes multiple pieces of UCI to generate a coded bit sequence h. The coded bit sequence h includes $h_0, h_1, \ldots, h_{Etot-1}$. Here, $h_k$ (k is an integer ranging from 0 to $E_{tot}$−1) denotes the k-th coded bit of the coded bit sequence h. For example, in a case that a first CSI part and a second CSI part are transmitted on the PUCCH, the coded bit sequence g for the first CSI part and the coded bit sequence g for the second CSI part are multiplexed to generate the coded bit sequence h. In a case that multiplexer 1005 does not multiplex multiple pieces of UCI, the coded bit sequence h is the coded bit sequence g.

The coded bit sequence h may be transmitted on the PUCCH. The coded bit sequence h may be mapped to the PUCCH. The coded bit sequence h may be included in the PUCCH. The coded bit sequence h may be transmitted on the PUSCH. The coded bit sequence h may be mapped to the PUSCH. The coded bit sequence h may be included in the PUSCH.

The coded bit sequence h mapped to the PUCCH may be scrambled. The scrambled sequence may be modulated. The coded bit sequence h mapped to the PUSCH may be scrambled. The scrambled sequence may be modulated.

In the repetition of the PUCCH as illustrated in FIG. 9, a sequence based PUCCH may be used. The sequence based PUCCH may be in a sequence based PUCCH format. The sequence-based PUCCH may be a PUCCH including no DMRS.

The sequence-based PUCCH is a PUCCH including means for transmitting information by associating the information with each of the sequences included in a prescribed set of sequences. For example, in a case that the prescribed set of sequences includes a first sequence associated with '00', a second sequence associated with '01', a third sequence associated with '10', and a fourth sequence associated with '11' and that the terminal apparatus 1 desires to notify the base station apparatus 3 of '01', the terminal apparatus 1 may select and transmit the second sequence on the PUCCH.

For example, in the sequence based PUCCH, the polar code need not be applied even in a case that the condition 1101 is satisfied. In the sequence based PUCCH, the polar code may be applied in a case that the condition 1101 is satisfied. For example, in the sequence based PUCCH, the Reed-Muller code need not be applied even in a case that the condition 1101 is not satisfied and that A is 3 or more. In the sequence based PUCCH, the Reed-Muller code may be applied in a case that the condition 1101 is not satisfied and that A is 3 or more. For example, in the sequence based PUCCH, no repetition code needs to be applied even in a case that the condition 1101 is not satisfied and that A is 2 or less. In the sequence based PUCCH, the repetition code may be applied in a case that the condition 1101 is not satisfied and that A is 2 or less.

Figure 13:
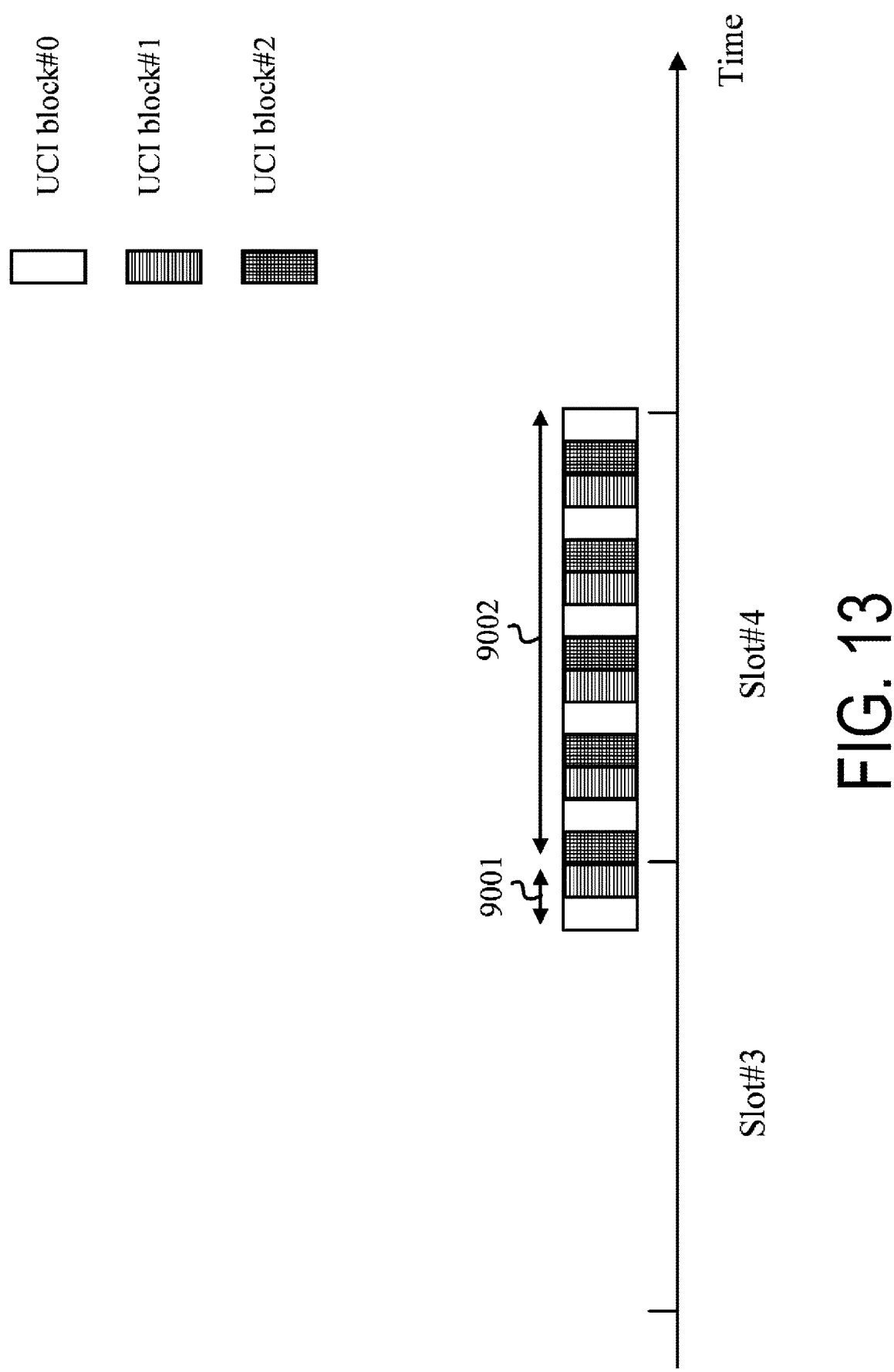
FIG. 13 is a diagram illustrating an example of mapping of uplink control information for a sequence-based PUCCH according to an aspect of the present embodiment.

FIG. 13 is a diagram illustrating an example of mapping of uplink control information for the sequence based PUCCH according to an aspect of the present embodiment. As illustrated in FIG. 13, one UCI block may be mapped to each of the OFDM symbols included in each of the PUCCH instance 9001 and the PUCCH instance 9002. The UCI block is a set of uplink control information bits or a set of coded bits $h_k$ mapped to one OFDM symbol.

For example, a modulation symbol generated from a set of bits included in the UCI block may be mapped to one OFDM symbol. A sequence selected by a set of bits included in the UCI block may be mapped to one OFDM symbol.

For example, the UCI block may be given by segmentation of the coded bit sequence h. For example, the coded bit sequence h of Eta bits may be segmented into $N_{block}$=ceil$(E_{tot}/N^{block}_{bit})$ UCI blocks. Here, $N^{block}_{bit}$ may indicate the maximum value of the number of bits included in one UCI block.

FIG. 13 illustrates an example of mapping of uplink control information for $N_{block}$ of 3. As illustrated in FIG. 13, by cyclically mapping each of the $N_{block}$ UCI blocks, preferable communication is realized.

In FIG. 13, mapping of the UCI blocks to the PUCCH instance 9001 starts with UCI block #0, and mapping of the UCI blocks to PUCCH instance 9002 starts with UCI block #2. In this way, the UCI mapping method is preferably adjusted for each PUCCH instance.

For example, the mapping of the UCI blocks to the PUCCH instance 9001 may start with UCI block #0. The mapping of the UCI block to the PUCCH instance 9001 may correspond to the UCI block subsequent to the UCI block mapped to the last OFDM symbol of the PUCCH instance 9001. In other words, in a case that $N_{9001}$ OFDM symbols in the PUCCH instance 9001 carry UCI and that UCI block #x is mapped to the first OFDM symbol of the OFDM symbols in the PUCCH instance 9001 carrying UCI, UCI block #(x+$N_{9001}$) may be mapped to the first OFDM symbol of the OFDM symbols in the PUCCH instance 9002 carrying UCI.

In other words, the terminal apparatus 1 may determine the mapping of the UCI block to the PUCCH instance 9002 based on at least $N_{9001}$. Furthermore, the base station apparatus 3 may receive the PUCCH instance 9002 for which the mapping of the UCI block is determined based on $N_{9001}$.

For example, the mapping of the UCI blocks to the PUCCH instance 9002 may be associated with the index of an OFDM symbol in a radio frame. For example, in a case that the index, in the radio frame, of OFDM symbols in the PUCCH9002 carrying the UCI is $l^{rf}_{symb}$, UCI block #(mod $(l^{rf}_{symb}, N_{block})$) may be mapped to the OFDM symbols.

In other words, the terminal apparatus 1 may map the UCI blocks based on at least the indexes, in the radio frame, of the OFDM symbols carrying the UCI. Here, the indexes of the OFDM symbols used for mapping the UCI blocks may be configured in the time domain other than in the radio frame. For example, indexes within a subframe may be used for mapping the UCI blocks. Indexes within a half radio frame may be used for mapping the UCI blocks. Indexes in two continuous radio frames may be used for mapping the UCI blocks.

For example, the first of the OFDM symbols in the PUCCH instance 9001 carrying the UCI may be configured by RRC signaling, and the first OFDM symbol of the OFDM symbols in the PUCCH instance 9002 carrying the UCI may be configured by RRC signaling.

For example, the terminal apparatus 1 may apply a prescribed amount C of cyclic shift to the coded bit sequence h. Here, a coded bit sequence j may be generated by applying the prescribed amount C of cyclic shift. The coded bit sequence j includes $j_0, j_1, \ldots, j_{Etot-1}$. Here, $j_k$ (k is an integer ranging from 0 to $E_{tot}-1$) indicates the k-th coded bit of the coded bit sequence j. $h_{mod\ (k+c,\ Etot)}$ may be input to coded bits $j_k$ by applying the prescribed amount C of cyclic shift. For example, the coded bit sequence j to which the prescribed amount C of cyclic shift has been applied may be mapped to the PUCCH.

For example, the prescribed amount C may be determined for each PUCCH instance. Here, the prescribed amount C determined for the PUCCH instance #s of the S PUCCH instances is referred to as a prescribed amount $C_s$. For example, the prescribed amount $C_s$ for the PUCCH instance #s may be determined based on at least some or all of a prescribed amount $C_{s-1}$ for the PUCCH instance #s−1, $N^{block}_{bit}$, and the number $N_{s-1}$ of OFDM symbols included in the PUCCH instance #s−1.

In other words, a different prescribed amount $C_s$ may be determined for each of the S PUCCH instances.

For example, the prescribed amount $C_s$ for the PUCCH instance #s may be determined based on at least $C_{s-1}+N_{s-1}*N^{block}_{bit}$. For example, the prescribed amount $C_s$ for the PUCCH instance #s may be set to $C_{s-1}+N_{s-1}*N^{block}_{bit}+O_s$. Here, $O_s$ denotes an offset value for the PUCCH instance #s. For example, the $O_s$ may be 0. For example, $O_s$ may be an offset value configured for each PUCCH instance.

For example, the prescribed amount $C_s$ for the PUCCH instance #s may be determined based on at least the indexes $l^{frame}_{sym}$ of OFDM symbols in a radio frame. For example, the prescribed amount $C_s$ for the PUCCH instance #s may be determined based on at least $l^{frame}_{sym}*N^{block}_{bit}$. For example, the prescribed amount $C_s$ for the PUCCH instance #s may be set to $l^{frame}_{sym}*N^{bit}_{block}+O_s$. Instead of the indexes of the OFDM symbols in the radio frame, OFDM symbol indexes $l_{sym}$ in a slot may be used. Instead of the indexes of the OFDM symbols in the radio frame, OFDM symbol indexes $l^{subframe}_{sym}$ in a subframe may be used. Instead of the indexes of the OFDM symbols in the radio frame, OFDM symbol indexes $l^{hlf}_{sym}$ in a half radio frame may be used. Further, instead of the indexes of the OFDM symbols in the radio frame, indexes configured in the S PUCCH instances may be used.

The indexes configured in the S PUCCH instances may be OFDM symbol indexes in the OFDM symbols included in the S PUCCH instances. For example, in a case that the first OFDM symbol in 9001 has index 0, the index of the last OFDM symbol in 9001 may be 1. The index of the first OFDM symbol in 9002 may be 2. The index of the last OFDM symbol in 9002 may be 15. In other words, for example, the index of the first OFDM symbol in the PUCCH instance #s may be determined based on at least the sum of the numbers of OFDM symbols in the PUCCH instances #0 to #s−1. The index of the first OFDM symbol in the PUCCH instance #s may be equal to the sum of the numbers of OFDM symbols in the PUCCH instances #0 to #s−1.

For example, the prescribed amount $C_s$ for the PUCCH instance #s may be set to $O_s$. For example, $O_s$ may be determined based on at least a higher layer parameter. $O_s$ may be indicated by the higher layer parameter. For each of the S PUCCH instances, $O_s$ may be determined based on at least the higher layer parameter. For each of the S PUCCH instances, $O_s$ may be indicated by the higher layer parameter.

For example, the prescribed amount $C_s$ may be applied to the bit sequence a. The prescribed amount $C_s$ may be applied to the bit sequence c. The prescribed amount $C_s$ may be applied to the coded bit sequence d. The prescribed amount $C_s$ may be applied to the coded bit sequence y. The prescribed amount $C_s$ may be applied to the coded bit sequence e. The prescribed amount $C_s$ may be applied to the coded bit sequence f. The prescribed amount $C_s$ may be applied to the coded bit sequence g. The prescribed amount $C_s$ may be applied to a modulated symbol sequence obtained by modulating the coded bit sequence.

Various aspects of apparatuses according to an aspect of the present embodiment will be described below.

(1) In order to accomplish the object described above, an aspect of the present invention is contrived to provide the following means. Specifically, a first aspect of the present invention provides a terminal apparatus including a segmentation unit configured to segment a bit sequence of uplink control information into one or more code blocks, a coder configured to apply an error correction code to each of the one or more code blocks to generate one or more coded bit sequences, a rate matcher configured to apply bit selection for an s-th PUCCH instance of S PUCCH instances based on at least a length $E_s$ of a rate matching output sequence for the s-th PUCCH instance to generate a coded bit sequence for the s-th PUCCH instance, and a transmitter configured to transmit the coded bit sequence for the s-th PUCCH instance by using the s-th PUCCH instance, wherein the segmentation unit is configured to determine whether to segment the bit sequence of the uplink control information into the multiple code blocks based on at least a reference value related to a length of a rate matching output sequence, and the reference value is determined based on at least one of 1) a length $E_0$ of the rate matching output sequence for a 0-th instance of the PUCCH of the S PUCCH instances, 2) a length $E_{S-1}$ of the rate matching output sequence for an (S−1)-th instance of the PUCCH of the S PUCCH instances, 3) a maximum value of the length of the rate matching output sequence for each of the S PUCCH instances, 4) a minimum value of the length of the rate matching output sequence for each of the S PUCCH instances, and 5) a sum of the lengths of the rate matching output sequences for the respective S PUCCH instances.

(2) A second aspect of the present invention provides a terminal apparatus including a segmentation unit configured to segment a bit sequence of uplink control information into one or more code blocks, a coder configured to apply an error correction code to each of the one or more code blocks to generate one or more coded bit sequences, a rate matcher configured to apply bit selection for an s-th PUCCH instance of S PUCCH instances based on at least a length $E_s$ of a rate matching output sequence for the s-th PUCCH instance to generate a coded bit sequence for the s-th PUCCH instance, and a transmitter configured to transmit the coded bit sequence for the s-th PUCCH instance by using the s-th PUCCH instance, wherein the coder is configured to determine an array used to apply the error correction code, based on at least a reference value related to a length of rate matching output sequence, and the reference value is determined based on at least one of 1) a length $E_0$ of the rate matching output sequence for a 0-th instance of the PUCCH of the S PUCCH instances, 2) a length $E_s$ of the rate matching output sequence for an (S−1)-th instance of the PUCCH of the S PUCCH instances, 3) a maximum value of the length of the rate matching output sequence for each of the S PUCCH instances, 4) a minimum value of the length of the rate matching output sequence for each of the S PUCCH instances, and 5) a sum of the lengths of the rate matching output sequences for the respective S PUCCH instances.

(3) A third aspect of the present invention provides a base station apparatus including an antenna unit and a baseband unit, wherein a bit sequence of uplink control information is segmented into one or more code blocks, an error correction code is applied to each of the one or more code blocks to generate one or more coded bit sequences, bit selection is applied for an s-th PUCCH instance of S PUCCH instances based on at least a length $E_s$ of a rate matching output sequence for the s-th PUCCH instance to generate a coded bit sequence for the s-th PUCCH instance, the coded bit sequence for the s-th PUCCH instance is transmitted by using the s-th PUCCH instance, whether to segment the bit sequence of the uplink control information into the multiple code blocks is determined based on at least a reference value related to a length of a rate matching output sequence, the reference value is determined based on at least one of 1) a length $E_0$ of a rate matching output sequence for a 0-th instance of the PUCCH of the S PUCCH instances, 2) a length $E_{S-1}$ of a rate matching output sequence for an (S−1)-th instance of the PUCCH of the S PUCCH instances, 3) a maximum value of a length of a rate matching output sequence for each of the S PUCCH instances, 4) a minimum value of the length of the rate matching output sequence for each of the S PUCCH instances, and 5) a sum of lengths of rate matching output sequences for the respective S PUCCH instances, and the s-th PUCCH instance is received.

(4) A fourth aspect of the present invention provides a base station apparatus including an antenna unit and a baseband unit, wherein a bit sequence of uplink control information is segmented into one or more code blocks, an error correction code is applied to each of the one or more code blocks to generate one or more coded bit sequences, bit selection is applied for an s-th PUCCH instance of S PUCCH instances based on at least a length $E_s$ of a rate matching output sequence for the s-th PUCCH instance to generate a coded bit sequence for the s-th PUCCH instance, the coded bit sequence for the s-th PUCCH instance is transmitted by using the s-th PUCCH instance, an array used to apply the error correction code is determined based on at least a reference value related to a length of rate matching output sequence, the reference value is determined based on at least one of 1) a length $E_0$ of the rate matching output sequence for a 0-th instance of the PUCCH of the S PUCCH instances, 2) a length $E_{S-1}$ of the rate matching output sequence for an (S−1)-th instance of the PUCCH of the S PUCCH instances, 3) a maximum value of the length of the rate matching output sequence for each of the S PUCCH instances, 4) a minimum value of the length of the rate matching output sequence for each of the S PUCCH instances, and 5) a sum of the lengths of the rate matching output sequences for the respective S PUCCH instances, and the s-th PUCCH instance is received.

(5) A fifth aspect of the present invention provides a terminal apparatus including a coder configured to generate a first coded bit sequence by error correction coding of a bit sequence of uplink control information, a rate matcher configured to generate a second coded bit sequence by applying a prescribed amount $C_s$ of cyclic shift to the first coded bit sequence for an s-th PUCCH instance of S PUCCH instances, and a transmitter configured to transmit the second coded bit sequence by using the s-th PUCCH instance, wherein the prescribed amount $C_s$ is determined based on at least some or all of a prescribed amount $C_{s-1}$ for an (s−1)-th PUCCH instance, the number of OFDM symbols included in the (s−1)-th PUCCH instance, and the number $N^{block}_{bit}$ of coded bits mapped per OFDM symbol.

(6) A sixth aspect of the present invention provides a terminal apparatus including a coder configured to generate a first coded bit sequence by error correction coding of a bit sequence of uplink control information, a rate matcher configured to generate a second coded bit sequence by applying a prescribed amount $C_s$ of cyclic shift to the first coded bit sequence for an s-th PUCCH instance of S PUCCH instances, and a transmitter configured to transmit the second coded bit sequence by using the s-th PUCCH instance, wherein the prescribed amount $C_s$ is determined based on at least either indexes of OFDM symbols in a radio frame or indexes of OFDM symbols included in the S PUCCH instances.

(7) A seventh aspect of the present invention provides a terminal apparatus including a coder configured to generate a first coded bit sequence by error correction coding of a bit sequence of uplink control information, a rate matcher configured to generate a second coded bit sequence by applying a prescribed amount $C_s$ of cyclic shift to the first coded bit sequence for an s-th PUCCH instance of S PUCCH instances, and a transmitter configured to transmit the second coded bit sequence by using the s-th PUCCH instance, wherein the prescribed amount $C_s$ is indicated by a higher layer parameter.

(8) An eighth aspect of the present invention provides a base station apparatus including an antenna unit and a baseband unit, wherein a first coded bit sequence is generated by error correction coding of a bit sequence of uplink control information, a second coded bit sequence is generated by applying a prescribed amount $C_s$ of cyclic shift to the first coded bit sequence for an s-th PUCCH instance of S PUCCH instances, the second coded bit sequence is transmitted by using the s-th PUCCH instance, the prescribed amount $C_s$ is determined based on at least some or all of a prescribed amount $C_{s-1}$ for an (s−1)-th PUCCH instance, the number of OFDM symbols included in the (s−1)-th PUCCH instance, and the number $N^{block}_{bit}$ of coded bits mapped per OFDM symbol, and the s-th PUCCH instance is received.

(9) A ninth aspect of the present invention provides a base station apparatus including an antenna unit and a baseband unit, wherein a first coded bit sequence is generated by error correction coding of a bit sequence of uplink control information, a second coded bit sequence is generated by applying a prescribed amount $C_s$ of cyclic shift to the first coded bit sequence for an s-th PUCCH instance of S PUCCH instances, the second coded bit sequence is transmitted by using the s-th PUCCH instance, the prescribed amount $C_s$ is determined based on at least either indexes of OFDM symbols in a radio frame or indexes of OFDM symbols included in the S PUCCH instances, and the s-th PUCCH instance channel is received.

(10) A tenth aspect of the present invention provides a base station apparatus including an antenna unit and a baseband unit, wherein a first coded bit sequence is generated by error correction coding of a bit sequence of uplink control information, a second coded bit sequence is generated by applying a prescribed amount $C_s$ of cyclic shift to the first coded bit sequence for an s-th PUCCH instance of S PUCCH instances, the second coded bit sequence is transmitted by using the s-th PUCCH instance, the prescribed amount $C_s$ is indicated by a higher layer parameter, and the s-th PUCCH instance is received.

A program running on the base station apparatus 3 and the terminal apparatus 1 according to an aspect of the present invention may be a program that controls a Central Processing Unit (CPU) and the like, such that the program causes a computer to operate in such a manner as to realize the functions of the above-described embodiment according to an aspect of the present invention. Also, the information handled in these apparatuses is temporarily loaded into a Random Access Memory (RAM) while being processed, is then stored in a Hard Disk Drive (HDD) and various types of Read Only Memory (ROM) such as a Flash ROM, and is read, modified, and written by the CPU, as necessary.

Note that the terminal apparatus 1 and the base station apparatus 3 according to the above-described embodiment may be partially achieved by a computer. In that case, this configuration may be realized by recording a program for realizing such control functions on a computer-readable recording medium and causing a computer system to read the program recorded on the recording medium for execution.

Note that it is assumed that the "computer system" mentioned here refers to a computer system built into the terminal apparatus 1 or the base station apparatus 3, and the computer system includes an OS and hardware components such as a peripheral device. A "computer-readable recording medium" refers to a portable medium such as a flexible disk, a magneto-optical disk, a ROM, and a CD-ROM, and a storage device such as a hard disk built into the computer system.

Moreover, the "computer-readable recording medium" may include a medium that dynamically stores a program for a short period of time, such as a communication line in a case that the program is transmitted over a network such as the Internet or over a communication line such as a telephone line, and may also include a medium that stores the program for a fixed period of time, such as a volatile memory included in the computer system functioning as a server or a client in such a case. The above-described program may be one for realizing some of the above-described functions, and also may be one capable of realizing the above-described functions in combination with a program already recorded in a computer system.

Furthermore, the base station apparatus 3 according to the aforementioned embodiment may be achieved as an aggregation (apparatus group) including multiple apparatuses. Each of the apparatuses included in such an apparatus group may include each function, or some or all portions of each functional block of the base station apparatus 3 according to the aforementioned embodiment. As the apparatus group, it is only necessary to have a complete set of functions or functional blocks of the base station apparatus 3. Moreover, the terminal apparatus 1 according to the aforementioned embodiment can also communicate with the base station apparatus as the aggregation.

Also, the base station apparatus 3 according to the aforementioned embodiment may be an Evolved Universal Terrestrial Radio Access Network (EUTRAN) and/or a Next-Gen RAN (NG-RAN or NR RAN). Moreover, the base station apparatus 3 according to the aforementioned embodiment may have some or all of the functions of a higher node for an eNodeB and/or a gNB.

Also, some or all portions of each of the terminal apparatus 1 and the base station apparatus 3 according to the aforementioned embodiment may be implemented as an LSI which is a typical integrated circuit or may be implemented as a chip set. The functional blocks of each of the terminal apparatus 1 and the base station apparatus 3 may be individually implemented as a chip, or some or all of the functional blocks may be integrated into a chip. Furthermore, a circuit integration technique is not limited to the LSI, and may be realized with a dedicated circuit or a general-purpose processor. Moreover, in a case that a circuit integration technology that substitutes an LSI appears with the advance of the semiconductor technology, it is also possible to use an integrated circuit based on the technology.

In addition, although the aforementioned embodiments have described the terminal apparatus as an example of a communication apparatus, the present invention is not limited to such a terminal apparatus, and is applicable to a terminal apparatus or a communication apparatus that is a stationary type or a non-movable type electronic apparatus installed indoors or outdoors, for example, such as an AV device, a kitchen device, a cleaning or washing machine, an air-conditioning device, office equipment, a vending machine, and other household appliances.

Although, the embodiments of the present invention have been described in detail above referring to the drawings, the specific configuration is not limited to the embodiments and includes, for example, design changes within the scope that does not depart from the gist of the present invention. For an aspect of the present invention, various modifications are possible within the scope of the claims, and embodiments that are made by suitably combining technical means disclosed according to the different embodiments are also included in the technical scope of the present invention. A configuration in which elements described in the respective embodiments and having mutually the same effects, are substituted for one another is also included.

INDUSTRIAL APPLICABILITY

An aspect of the present invention can be utilized, for example, in a communication system, communication equipment (for example, a cellular phone apparatus, a base station apparatus, a wireless LAN apparatus, or a sensor device), an integrated circuit (for example, a communication chip), or a program.

REFERENCE SIGNS LIST 1 (1A, 1B, 1C) Terminal apparatus
3 Base station apparatus
10, 30 Radio transmission and/or reception unit
10*a*, 30*a* Radio transmitting unit
10*aa* Channel coding/scrambling/modulation unit
10*ab* Layer mapping unit
10*ac* Precoder
10*ad* Time signal generation unit
10*ae* Spatial filter unit
10*af* Antenna unit
10*b*, 30*b* Radio receiving unit
10*ba* Channel decoding/descrambling/demodulation unit
10*bb* Layer demapping unit
10*bc* Channel demodulation unit
10*bd* Frequency signal generation unit
10*be* Spatial filter unit
10*bf* Antenna unit
11, 31 Antenna unit
12, 32 RF unit
13, 33 Baseband unit
14, 34 Higher layer processing unit
15, 35 Medium access control layer processing unit
16, 36 Radio resource control layer processing unit
91, 92, 93, 94 Search space set
300 Component carrier
301 Primary cell
302, 303 Secondary cell
1600 Spatial filter set
1700 Codebook set
3000 Point
3001, 3002 Resource grid
3003, 3004 BWP
3011, 3012, 3013, 3014 Offset
3100, 3200 Common resource block set
9001, 9002 PUSCH instance
1001 Segmentation unit
1002 Coder
1003 Rate matcher
1004 Concatenation unit
1005 Multiplexer
1101, 1102 Condition

The invention claimed is:

1. A terminal apparatus comprising:
encoding circuitry configured to:
generate a first encoded bit sequence d by encoding a bit sequence, and
generate a second encoded bit sequence by applying a cyclic shift of a predetermined amount of $C_s$ to the first encoded bit sequence d for an s-th uplink channel entity of S uplink channel entities; and
transmission circuitry configured to transmit the S uplink channels; wherein
the encoding circuitry is configured to determine the predetermined amount of $C_s$ based on the predetermined amount of $C_{s-1}$ for an s-1-th uplink channel entity among the S uplink channel entities.

2. A communication method performed by a terminal apparatus, the communication method comprising:
generating a first encoded bit sequence d by encoding a bit sequence,
generating a second encoded bit sequence by applying a cyclic shift of a predetermined amount of $C_s$ to the first encoded bit sequence d for an s-th uplink channel entity of S uplink channel entities;
transmitting the S uplink channels; and
determining the predetermined amount of Cs based on the predetermined amount of $C_{s-1}$ for an s-1-th uplink channel entity among the S uplink channel entities.

* * * * *